US011919310B2

(12) United States Patent
Laubenberger et al.

(10) Patent No.: US 11,919,310 B2
(45) Date of Patent: Mar. 5, 2024

(54) DEVICES, SYSTEMS, AND METHODS FOR PRINTHEAD CLEANING AND DIAGNOSTICS

(71) Applicant: Canon Solutions America, Inc., Melville, NY (US)

(72) Inventors: Michael Laubenberger, Boca Raton, FL (US); Jeffrey David Kane, Boynton Beach, FL (US)

(73) Assignee: Canon Solutions America, Inc., Melville, NY (US)

( * ) Notice: Subject to any disclaimer, the term of this patent is extended or adjusted under 35 U.S.C. 154(b) by 262 days.

(21) Appl. No.: 17/115,217

(22) Filed: Dec. 8, 2020

(65) Prior Publication Data

US 2022/0176703 A1 Jun. 9, 2022

(51) Int. Cl.
*B41J 2/165* (2006.01)

(52) U.S. Cl.
CPC ....... *B41J 2/16552* (2013.01); *B41J 2/16526* (2013.01); *B41J 2/16535* (2013.01); *B41J 2002/16564* (2013.01); *B41J 2002/16573* (2013.01)

(58) Field of Classification Search
CPC ................ B41J 2/16552; B41J 2/16526; B41J 2/16535; B41J 2002/16564; B41J 2002/16573
See application file for complete search history.

(56) References Cited

U.S. PATENT DOCUMENTS 5,969,731 A * 10/1999 Michael ............... B41J 2/16535 347/33
6,497,471 B1 12/2002 Gargir
6,660,103 B1 12/2003 Johnston
(Continued)

FOREIGN PATENT DOCUMENTS

CN 111 016 439 A 4/2020
DE 20 2019 102598 U1 11/2019
(Continued)

OTHER PUBLICATIONS

Paul Attwell, Automated Print Head Testing, downloaded Aug. 31, 2020.

(Continued)

*Primary Examiner* — Sharon Polk
(74) *Attorney, Agent, or Firm* — Canon U.S.A., Inc. IP Division

(57) ABSTRACT

Some embodiments of a device comprise a cleaning-fluid-supply reservoir; a cleaning-fluid-supply conduit; one or more electrical connectors that are configured to be attached to a printhead and supply electrical signals to the printhead; one or more memories; and one or more processors that are in communication with the one or more memories. Also, the one or more processors cooperate with the one or more memories to cause the device to perform operations that include supplying cleaning fluid from the cleaning-fluid-supply reservoir, through the cleaning-fluid-supply conduit, to the printhead, and while supplying the cleaning fluid to the printhead, sending a signal to the printhead, through the one or more electrical connectors, to activate one or more piezo-electric actuators of the printhead.

20 Claims, 18 Drawing Sheets

(56) References Cited

U.S. PATENT DOCUMENTS

| | | | |
|---|---|---|---|
| 7,165,825 | B2 | 1/2007 | Michele |
| 9,315,029 | B2 | 4/2016 | Fernando |
| 10,427,408 | B2 | 10/2019 | Tuset |
| 2011/0047427 | A1 | 2/2011 | Bailey |
| 2011/0156734 | A1 | 6/2011 | Berry |
| 2012/0218346 | A1 | 8/2012 | Inoue |
| 2013/0106454 | A1 | 5/2013 | Liu |
| 2020/0047502 | A1 | 2/2020 | Saito |
| 2020/0114647 | A1 | 4/2020 | Andres |
| 2021/0245510 | A1 | 8/2021 | Rosenberg |
| 2021/0309012 | A1 | 10/2021 | Reder |
| 2022/0169027 | A1 | 6/2022 | Watanabe |

FOREIGN PATENT DOCUMENTS

| | | | | | |
|---|---|---|---|---|---|
| JP | 2010005856 | A | | 1/2010 | |
| JP | 2020059188 | A | | 4/2020 | |
| TW | 201008787 | A | | 3/2010 | |
| WO | WO-2019027421 | A1 | * | 2/2019 | ............... B08B 1/00 |
| WO | 2020/018876 | A1 | | 1/2020 | |
| WO | WO-2020198129 | A1 | * | 10/2020 | .......... B41J 2/16508 |

OTHER PUBLICATIONS

Epson Print Head Recovery Manual with Print Head Doctor, downloaded Aug. 31, 2020.

Print Head Doctor 11, 12, 13, 14 & 15 User's Manual, downloaded Aug. 31, 2020.

* cited by examiner

DEVICES, SYSTEMS, AND METHODS FOR PRINTHEAD CLEANING AND DIAGNOSTICS

BACKGROUND

Technical Field

The present disclosure generally concerns devices, systems, and methods for cleaning printheads and performing diagnostics on printheads.

Background

The printheads of inkjet printers (e.g., drop-on-demand inkjet printers) may include hundreds, thousands, or tens of thousands of nozzles. Also, each nozzle may have a respective ink chamber, and each nozzle may have a respective piezo-electric actuator or a respective heater element. When a charge is applied to a piezo-electric actuator, the piezo-electric actuator changes shape, and the change of shape forces ink from the ink chamber though the nozzle. When a charge is applied to a heater element, the heater element heats the ink in the ink chamber, which vaporizes some of the ink and creates a bubble that forces some of the ink though the nozzle. With use and with the passage of time, ink, dust, and paper fibers may be deposited on the printhead, and some nozzles may become clogged. Also, the heater elements and the other electronics in the printhead may degrade with use and with the passage of time, which may decrease the performance of the printhead (e.g., reduce print quality).

SUMMARY

Some embodiments of a device comprise a cleaning-fluid-supply reservoir; a cleaning-fluid-supply conduit; one or more electrical connectors that are configured to be attached to a printhead and supply electrical signals to the printhead; one or more memories; and one or more processors that are in communication with the one or more memories. Also, the one or more processors cooperate with the one or more memories to cause the device to perform operations that include supplying cleaning fluid from the cleaning-fluid-supply reservoir, through the cleaning-fluid-supply conduit, to the printhead, and while supplying the cleaning fluid to the printhead, sending a signal to the printhead, through the one or more electrical connectors, to activate one or more piezo-electric actuators of the printhead.

Some embodiments of a method comprise supplying cleaning fluid from a cleaning-fluid-supply reservoir, through a cleaning-fluid-supply conduit, to a printhead, wherein the printhead includes a plurality of nozzles; and, while supplying the cleaning fluid to the printhead, sending signals to the printhead, through one or more electrical connectors, to activate one or more nozzles of the plurality of nozzles.

Some embodiments of a device comprise a cleaning-fluid-supply reservoir; a cleaning-fluid-supply hose; one or more memories; and one or more processors that are in communication with the one or more memories. Also, the one or more processors cooperate with the one or more memories to cause the device to perform operations that include obtaining data that indicate one or more operating settings of the printhead, wherein the one or more operating settings include one or more of the following: a cleaning-fluid-pressure threshold and a cleaning-fluid temperature threshold; setting a cleaning-fluid pressure and a cleaning-fluid temperature, wherein the cleaning-fluid pressure is set to a pressure that exceeds the cleaning-fluid-pressure threshold or the cleaning-fluid temperature is set to a temperature that exceeds the cleaning-fluid-temperature threshold; and supplying cleaning fluid from the cleaning-fluid-supply reservoir, through the cleaning-fluid-supply hose, to the printhead according to the cleaning-fluid pressure and the cleaning-fluid temperature.

DETAILED DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. Furthermore, some embodiments include features from two or more of the following explanatory embodiments.

Also, as used herein, the conjunction "or" generally refers to an inclusive "or," though "or" may refer to an exclusive "or" if expressly indicated or if the context indicates that the "or" must be an exclusive "or."

Additionally, in this description and the drawings, an alphabetic suffix on a reference number may be used to indicate a specific instance of the feature identified by the reference number. For example, the conduits in a group of conduits may be identified with the reference number 181 when a particular conduit is not being distinguished. However, 181A may be used to identify a specific conduit when the specific conduit is being distinguished from the rest of the conduits 181.

Figure 1:
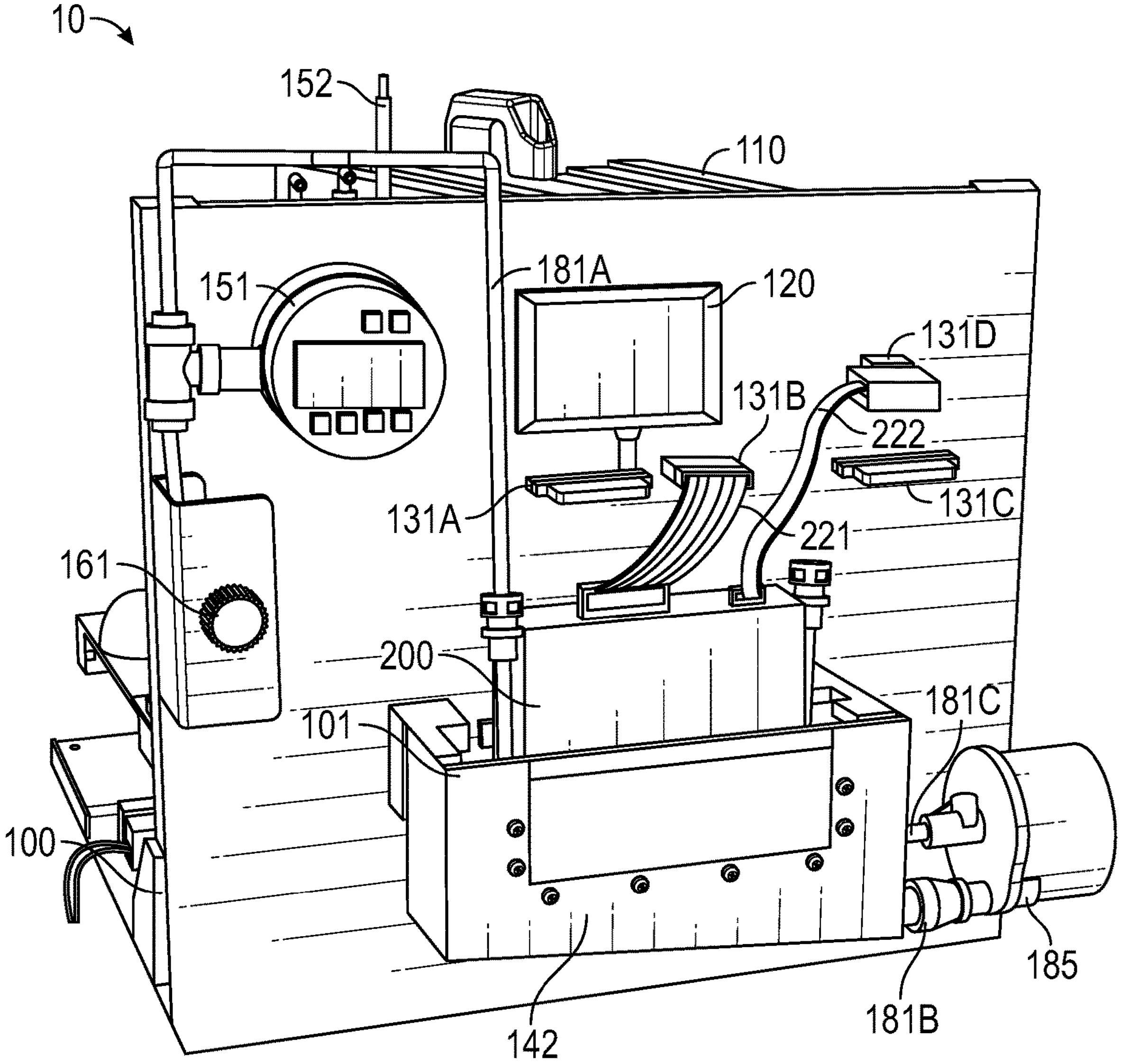
FIG. 1 is a perspective view of an example embodiment of a printhead-maintenance device.
Figure 2:
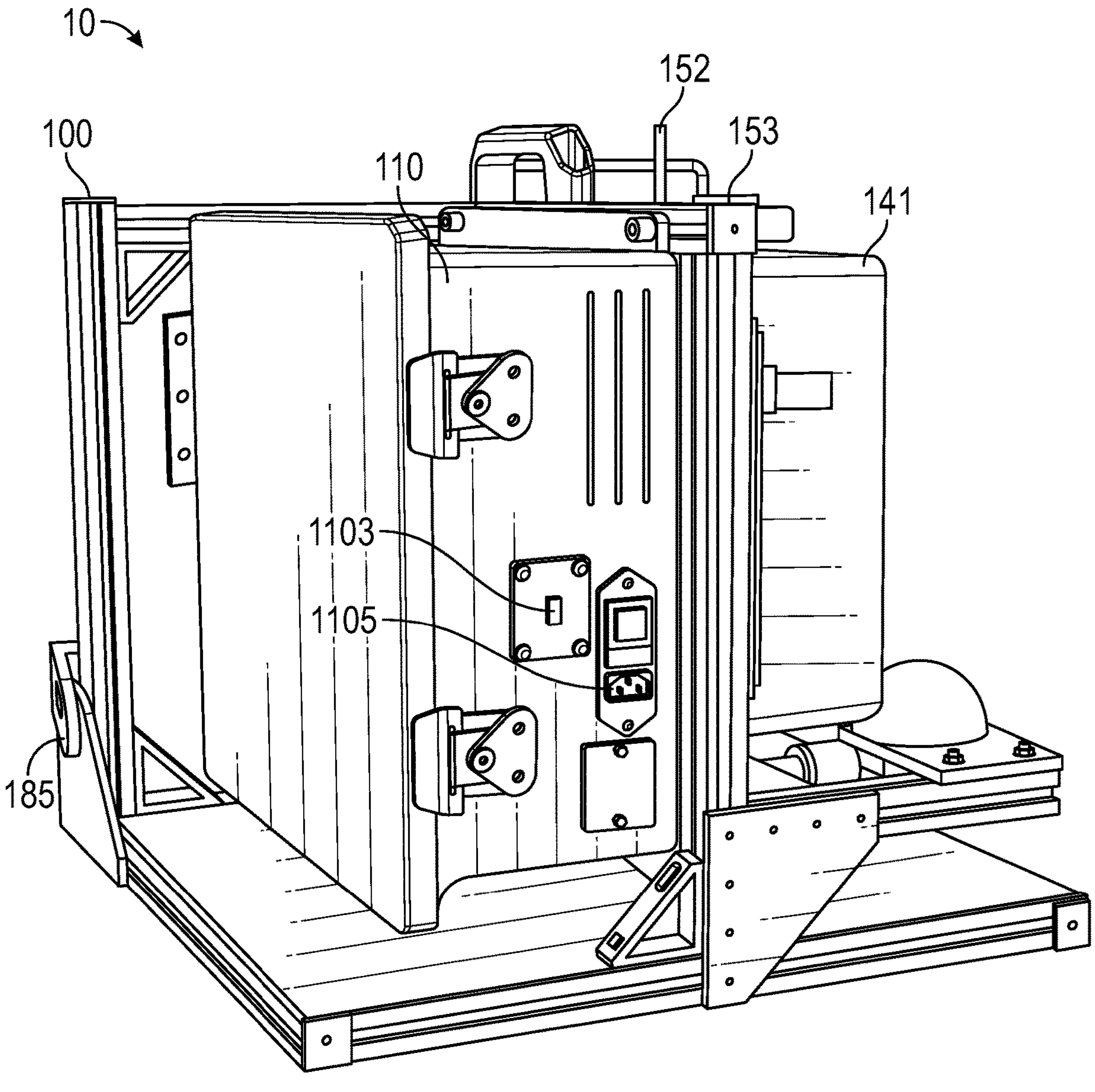
FIG. 2 is another perspective view of the example embodiment of a printhead-maintenance device that is shown in FIG. 1.
Figure 3:
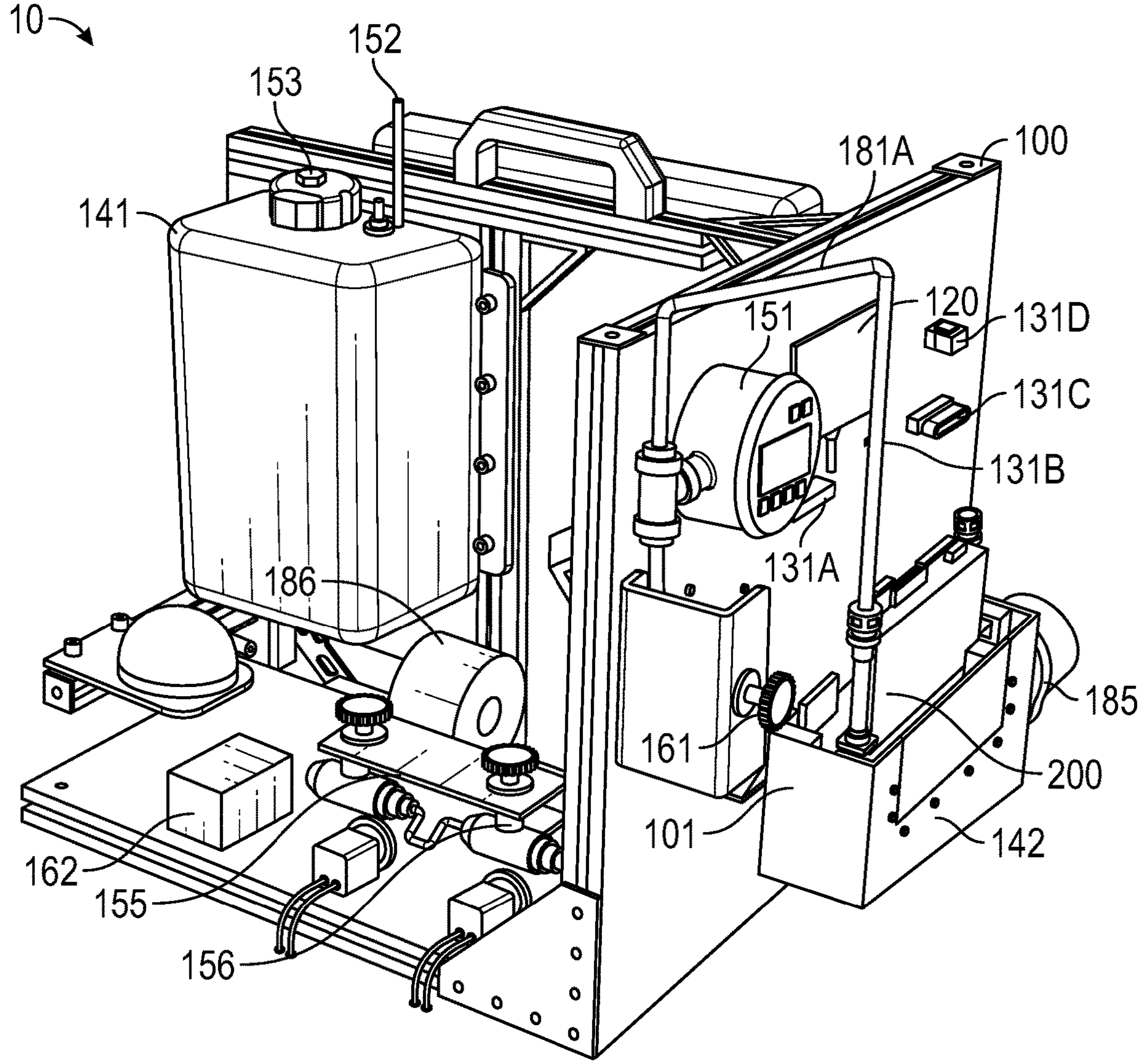
FIG. 3 is another perspective view of the example embodiment of a printhead-maintenance device that is shown in FIG. 1.

FIGS. 1, 2, and 3 are perspective views of an example embodiment of a printhead-maintenance device. The printhead-maintenance device 10 performs maintenance and diagnostic operations (e.g., electrical tests, cleaning operations) on printheads, such as the printhead 200 that is shown in FIGS. 1 and 3. The printhead-maintenance device 10 includes a body 100, a printhead holder 101, a control device 110, a display device 120 (e.g., a touchscreen), electrical connectors 131, a cleaning-fluid-supply tank 141, a cleaning-fluid-collection reservoir 142, a cleaning-fluid-pressure sensor 151, a cleaning-fluid-temperature sensor 152, a supply-level sensor 153, a pressure control 161, an air compressor 162, conduits 181 (e.g., pipes, tubes, hoses), a fluid-collection filter 185, a fluid-supply filter 186, and a collection-level sensor (not visible in FIGS. 1-3).

The printhead holder 101 is configured to hold or support the printhead 200. The printhead holder 101 may include one or more affixing mechanisms (e.g., dowel pins, clamps, claws, straps, bands, screws) that can hold the printhead 200 in place.

The cleaning-fluid-supply tank 141 stores cleaning fluid that can be supplied to a printhead. The supply-level sensor 153 detects the amount of cleaning fluid that is stored in the cleaning-fluid-supply tank 141, and the cleaning-fluid-temperature sensor 152 detects the temperature of the cleaning fluid that is stored in the cleaning-fluid-supply tank 141.

A supply conduit 181A may directly connect to the printhead 200 (e.g., as shown in FIGS. 1 and 3), or the supply conduit 181 may carry cleaning fluid or air to a printhead holder 101 that includes a conduit that connects to the printhead 200. The supply conduit 181A can transport cleaning fluid from the cleaning-fluid-supply tank 141, through the fluid-supply filter 186, to the printhead 200. The fluid-supply filter 186 removes air from the cleaning fluid, thereby reducing or eliminating air bubbles. Also, the printhead-maintenance device 10 includes a valve 155 that enables the printhead-maintenance device 10 to switch from supplying cleaning fluid to suppling air (e.g., pressurized air) to the printhead 200 through the supply conduit 181A. And the compressor 162 (or, in some embodiments, a fan or an air-supply port) supplies and pressurizes the air that is supplied to the printhead 200. The conduit-pressure sensor 151 detects the pressure of the cleaning fluid or the air in the supply conduit 181A. And, in this embodiment, a user can operate the pressure control 161 to set the pressure of the cleaning fluid or the pressure of the air in the supply conduit 181A. Furthermore, a flushing valve 156 can be operated to flush the contents of the supply conduit 181A or to flush the contents (e.g., cleaning fluid) of the cleaning-fluid-supply tank 141.

The cleaning fluid that is supplied to the printhead 200 travels through the printhead 200, exits the printhead 200 through one or more of the printhead's nozzles, and is collected by the cleaning-fluid-collection reservoir 142. The collection-level sensor detects the level of cleaning fluid in the cleaning-fluid-collection reservoir 142. A filter conduit 181B carries cleaning fluid from the cleaning-fluid-collection reservoir 142 to the fluid-collection filter 185, which filters the cleaning fluid. Some embodiments of the printhead-maintenance device 10 include a return conduit 181C that carries the filtered cleaning fluid to the cleaning-fluid-collection reservoir 142 or the cleaning-fluid-supply tank 141.

The electrical connectors 131 are configured to communicate with (e.g., send signals to, receive signals from) and supply power to the printhead 200. Each electrical connector 131 may be able to connect to multiple electrical lines (e.g., voltage-supply lines, data-transmission lines), which may allow the printhead-maintenance device 10 to communicate with the printhead 200 via multiple electrical lines. For example, in FIG. 1, a second electrical connector 131B is configured to connect to a ribbon cable 221, and the ribbon cable 221 includes multiple electrical lines. The electrical lines may allow the printhead-maintenance device 10 to control the operations of the printhead 200. For example, the electrical lines may allow the printhead-maintenance device 10 to activate one or more nozzles of the printhead 200, activate one or more heaters in the printhead 200, or supply power to the printhead 200.

Additionally, each of the electrical connectors 131 may be configured to connect with the wiring interface of one or more particular printhead models. For example, in FIG. 1, the second electrical connector 131B may be configured to connect to a ribbon cable 221 of the model of the printhead 200. Other electrical connectors (e.g., a first electrical connector 131A, a third electrical connector 131B) may be configured to connect with the wiring interfaces of other models of printheads. Also, some printheads include multiple wiring interfaces and can simultaneously connect with multiple electrical connectors 131. For example, in FIG. 1, a fourth electrical connector 131D is configured to connect to a wiring set 222 of the printhead 200. In some embodiments, the fourth electrical connector 131D supplies power to the printhead 200, and the first, second, and third electrical connectors 131A-C transmit signals (e.g., data) to, and receive signals from, the printhead 200.

The display device 120 displays information about the maintenance process and the printhead. For example, the display device 120 may display parameters of the maintenance process, such as cleaning-fluid temperature, cleaning-fluid pressure, maintenance time remaining, cleaning-fluid levels, amperes supplied to the printhead, voltages supplied to the printhead, a nozzle-activating rate, a nozzle-activating pattern, and printhead-heater settings. Examples of user interfaces that can be displayed by the display device 120 are shown in FIGS. 13-22. Also, the display device 120 may include a touchscreen, which can accept inputs from a user.

The control device 110 controls the operations of the printhead-maintenance device 10 and communicates with other devices (e.g., other computing devices). The control device 110 also includes a data connector 1103 and a power-supply connector 1105. The data connector 1103 is configured to accept a connection to a data cable (e.g., a networking cable, a serial cable, a USB cable). The power-supply connector 1105 is configured to connect to a power-supply cable.

Figure 4:
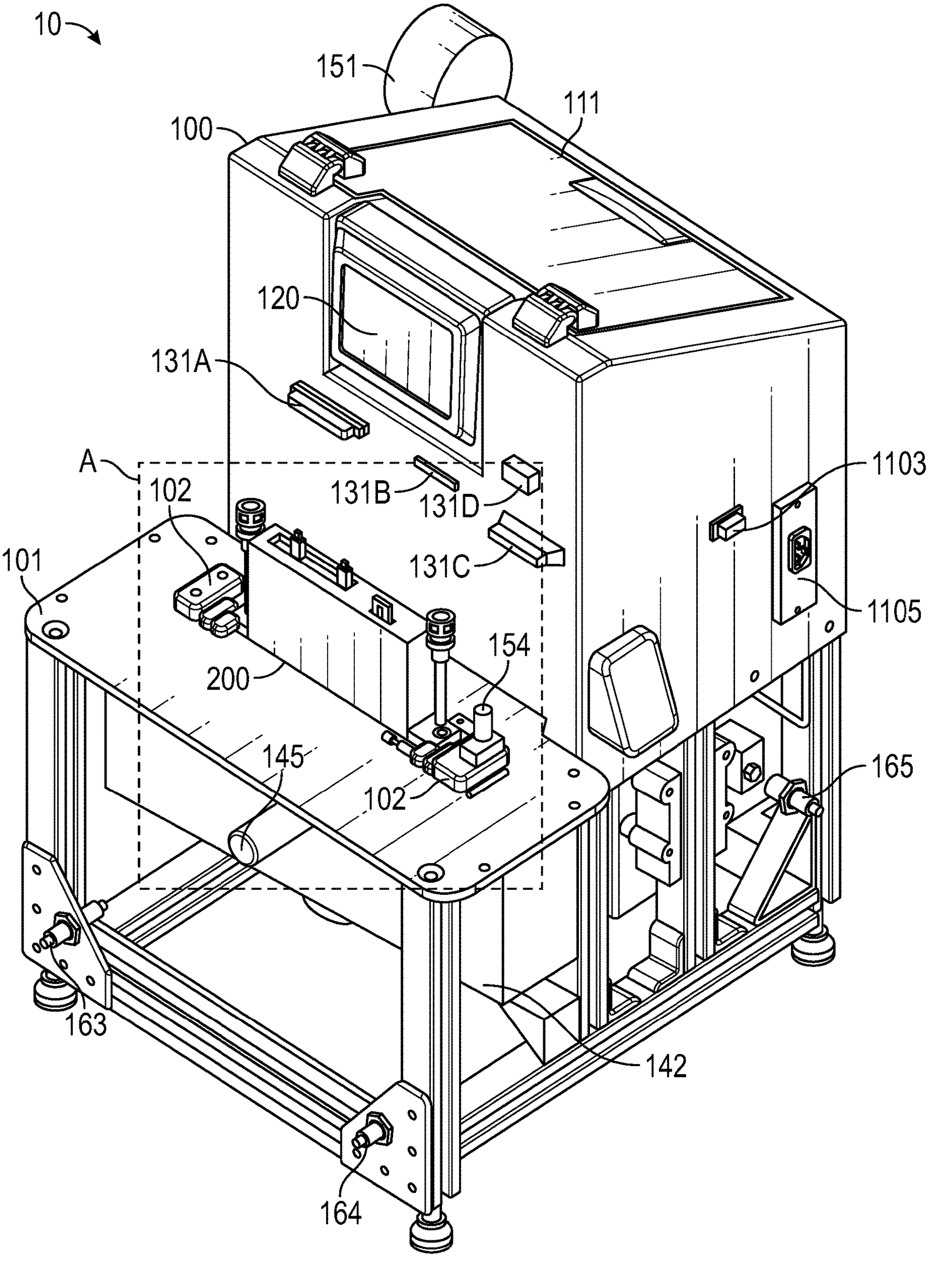
FIG. 4 is a perspective view of an example embodiment of a printhead-maintenance device.
Figure 5:
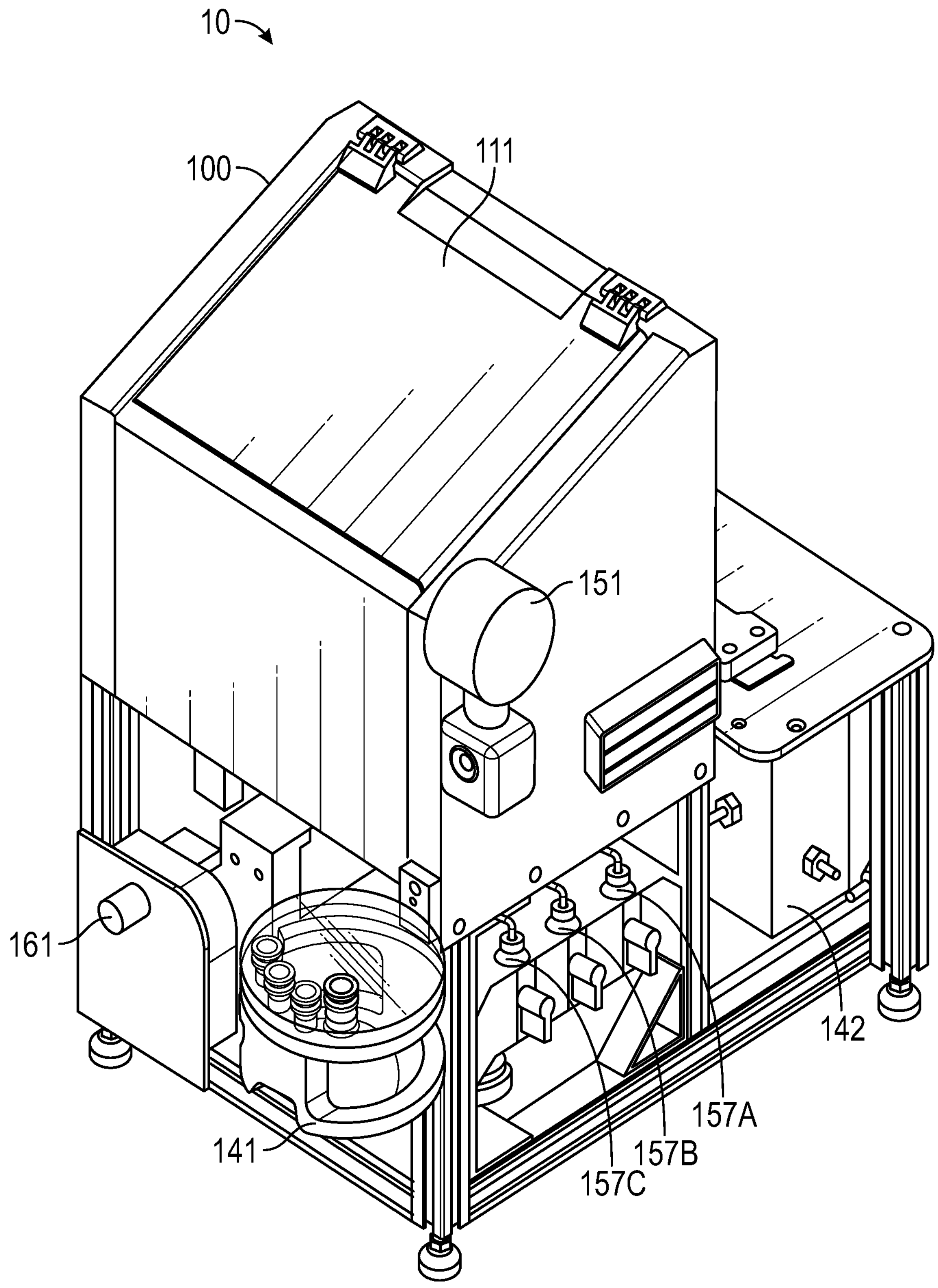
FIG. 5 is another perspective view of the example embodiment of a printhead-maintenance device that is shown in FIG. 4.
Figure 6:
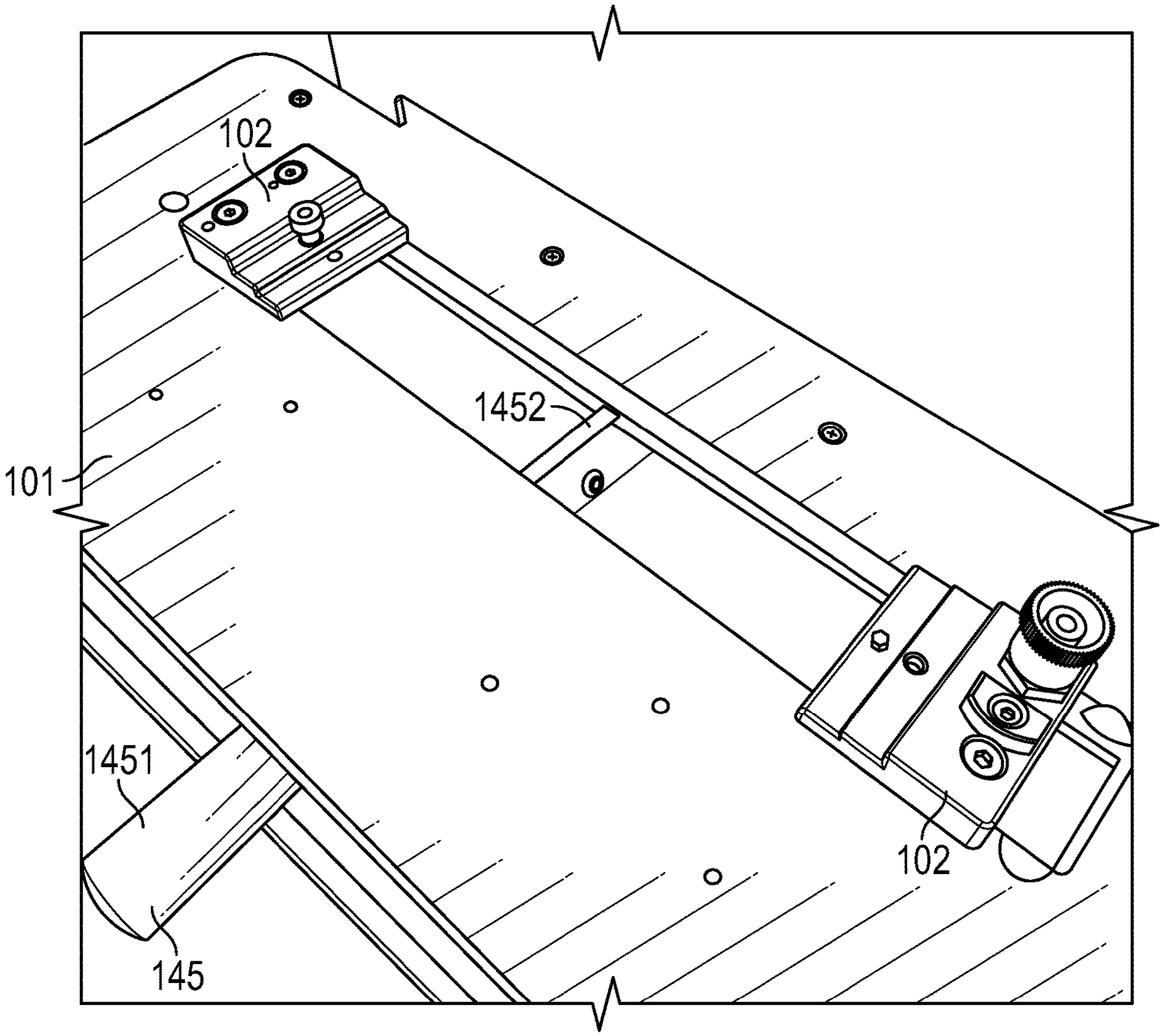
FIG. 6 is an enlarged view of area A in the example embodiment of a printhead-maintenance device that is shown in FIG. 4.

FIGS. 4, 5, and 6 are perspective views of an example embodiment of a printhead-maintenance device. The printhead-maintenance device 10 includes a body 100, a printhead holder 101 that includes two affixing mechanisms 102, an access panel 111, a display device 120, electrical connectors 131, a cleaning-fluid-collection reservoir 142, a fluid-removal mechanism 145, a cleaning-fluid-pressure sensor 151, a collection-level sensor 154, cleaning-supply valves 157, a pressure control 161, a waste-removal port 163, a liquid-supply port 164, an air inlet 165, a data connector 1103, and a power-supply connector 1105.

In this embodiment, the body 100 internally houses the following members: a control device, one or more cleaning-fluid-supply tanks, one or more cleaning-fluid-temperature sensors (at least one for each cleaning-fluid-supply tank), one or more supply-level sensors (at least one for each cleaning-fluid-supply tank), one or more conduits (e.g., supply conduits), a fluid-supply filter, and a fluid-collection filter. The members that are housed inside the body can be accessed via the access panel 111. The cleaning-supply valves 157 can be operated to select which of the cleaning-fluid-supply tanks will be used to supply cleaning fluid to the printhead. Thus, different cleaning fluids can be stored in each of the tanks, and the printhead-maintenance device 10 or a user can operate the cleaning-supply valves 157 to select which of the one or more of the cleaning-fluid-supply tanks will be used to supply cleaning fluid to the printhead.

The fluid-removal mechanism 145 removes fluids from the exterior of the printhead 200 (e.g., the nozzles of the printhead 200) that is held by the two affixing mechanisms 102. For example, in some embodiments the fluid-removal mechanism 145 includes a motor and a wiping mechanism that includes a rubber blade, a silicone blade, or a piece of textile (e.g., a microfiber cloth, a cotton cloth). The fluid-removal mechanism 145 may also include a vacuum, a blower, or an absorbent material. And the fluid-removal mechanism 145 may include a pressure sensor that detects a pressure that is being applied to the printhead 200 by a wiping mechanism. The control device can obtain the detected pressure and, based on the detected pressure, adjust the pressure that is being applied to the printhead 200 by the wiping mechanism.

The waste-removal port 163 is connected to the cleaning-fluid-collection reservoir 142 and can be used to drain the cleaning-fluid-collection reservoir 142. Also, in some embodiments, the waste-removal port 163 is connected to the cleaning-fluid-supply tank 141 and can be used to drain the cleaning-fluid-supply tank 141. The liquid-supply port 164 allows liquid (e.g., cleaning solution, ink) to be supplied to the printhead 200. The air inlet 165 can be connected to a pressure regulator, which may be used to increase or decrease the air pressure in the cleaning-fluid-supply tank 141. For example, in some embodiments the air pressure is decreased from 100 psi to 12 psi. The pressurized air in the cleaning-fluid-supply tank 141 causes the cleaning fluid to flow from the cleaning-fluid-supply tank 141, through the supply conduit 181A, to the printhead 200 or to the waste-removal port 163 (e.g., depending on the configuration of the valves of the waste-removal port 163).

FIG. 6 is an enlarged view of area A in FIG. 4. Also, the printhead is omitted from FIG. 6. In this embodiment, the fluid-removal mechanism 145 includes a handle 1451 and a wiper blade 1452 (e.g., a silicone wiper blade, a rubber wiper blade). A user can operate the handle 1451 (e.g., by sliding the handle 1451, by rotating the handle 1451) to control the wiper blade 1452 to wipe a printhead. In some embodiments, a motor causes the wiper blade 1452 to wipe a printhead, for example in response to a signal from the control device.

Figure 7:
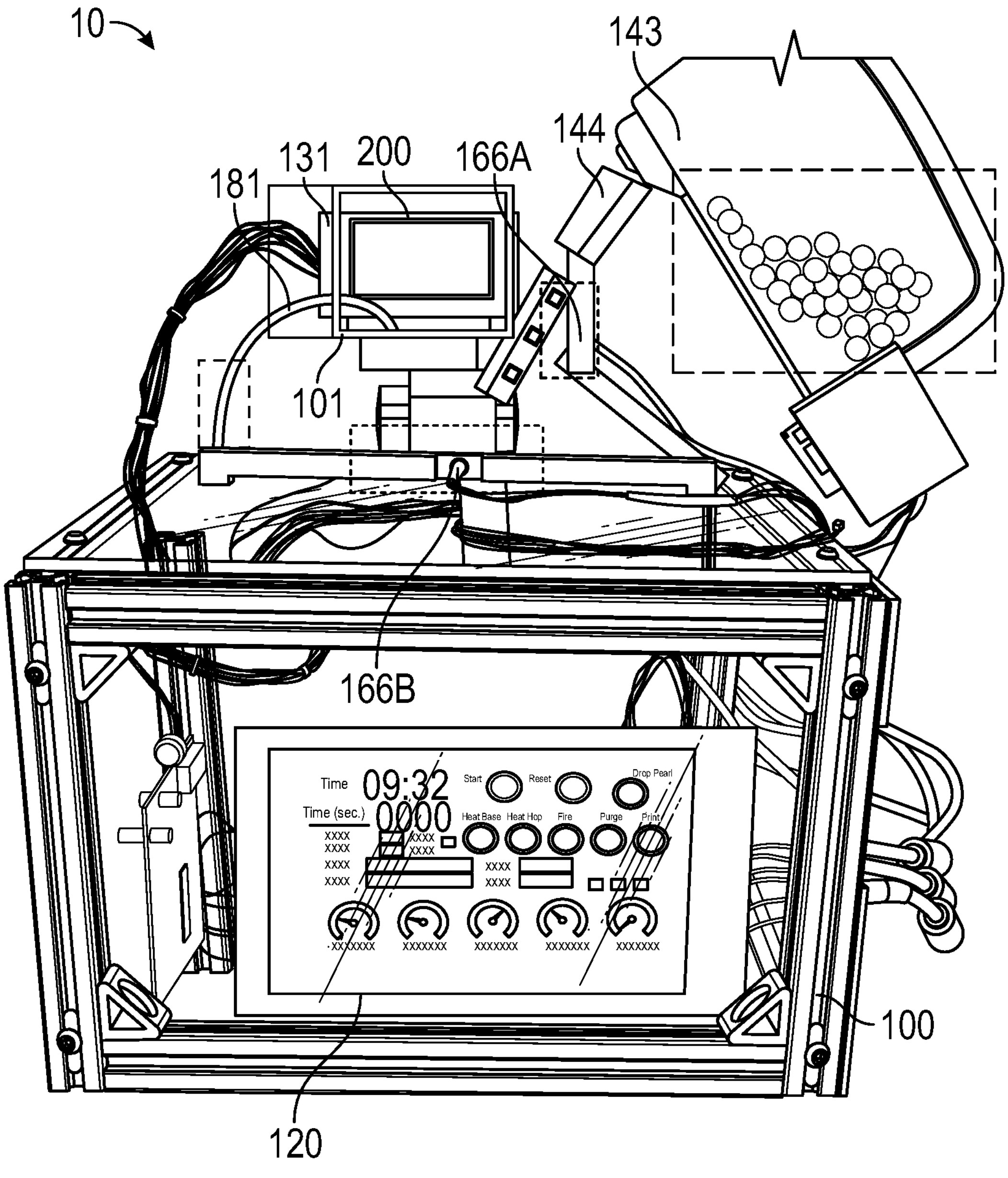
FIG. 7 illustrates an example embodiment of printhead maintenance device.
Figure 8:
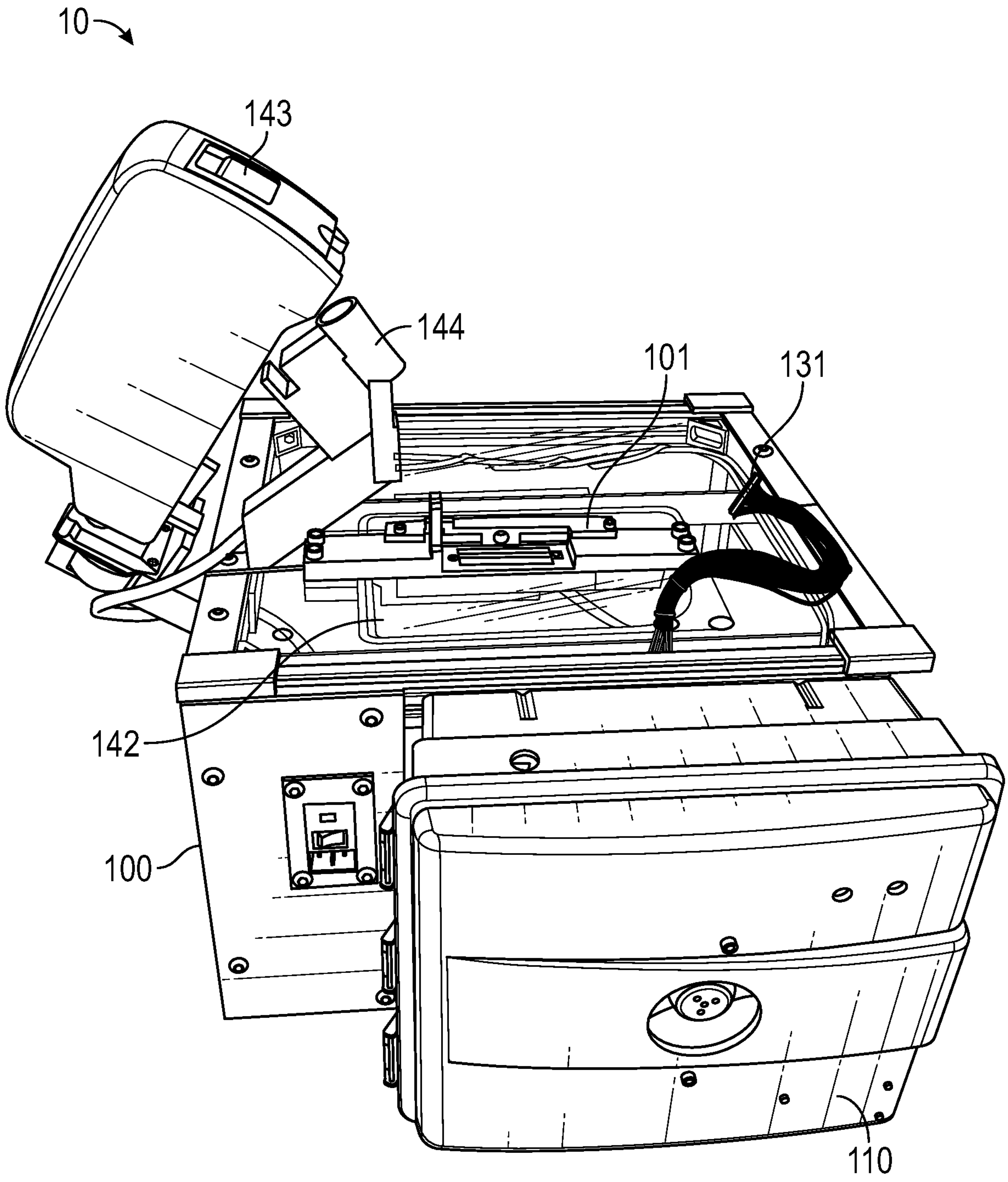
FIG. 8 is another perspective view of the example embodiment of a printhead-maintenance device that is shown in FIG. 7.

FIGS. 7 and 8 illustrate an example embodiment of printhead maintenance device. Also, the printhead 200 is omitted from FIG. 8. This embodiment of a printhead-maintenance device 10 is configured to perform maintenance and diagnostics on printheads that use gel inks. The printhead-maintenance device 10 includes a body 100, a printhead holder 101, a control device 110, a display device 120, an electrical connector 131, a cleaning-supply container 143, a cleaning-supply conveyor 144, temperature sensors 166, and a conduit 181. Also, in this embodiment, the body 100 internally houses an air compressor (not shown), a cleaning-fluid-collection reservoir 142, and a collection-level sensor (not shown).

The cleaning-supply container 143 stores cleaning pearls, which are supplied to the printhead 200 by the cleaning-supply conveyor 144. The printhead-maintenance device 10 activates one or more heaters in the printhead 200, which melt the cleaning pearls into liquid, and the liquid is fed through the printhead 200 using air that is supplied by the conduit 181 while the printhead-maintenance device 10 activates the nozzles of the printhead 200 via the electrical connector 131. The temperature sensors 166 monitor the temperatures of portions of the printhead 200.

Figure 9:
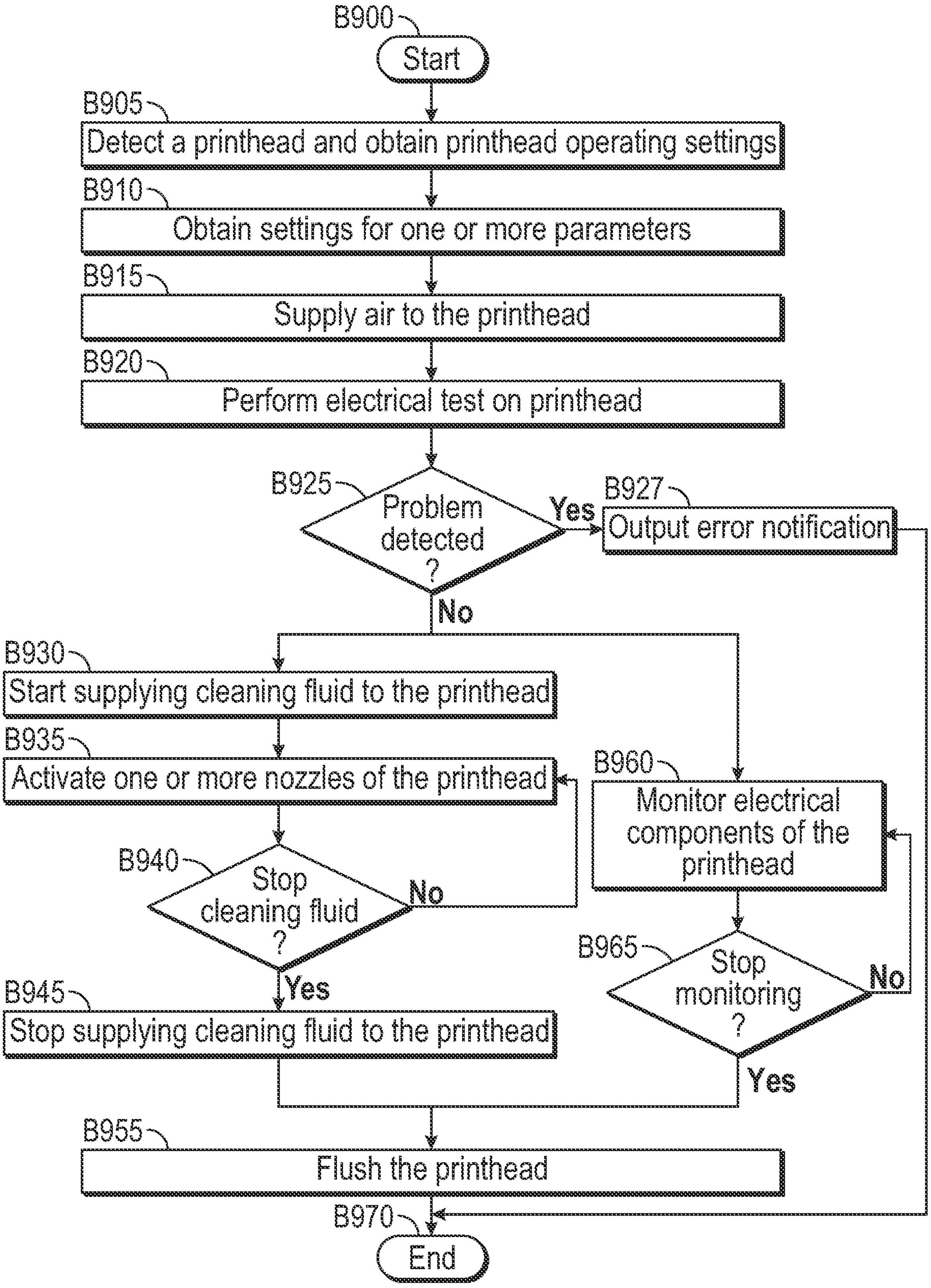
FIG. 9 illustrates an example embodiment of an operational flow for performing maintenance and diagnostics on a printhead.

FIG. 9 illustrates an example embodiment of an operational flow for performing maintenance and diagnostics on a printhead. Although this operational flow and the other operational flows that are described herein are each presented in a certain order, some embodiments may perform at least some of the operations in different orders than the presented orders. Examples of different orders include concurrent, parallel, overlapping, reordered, simultaneous, incremental, and interleaved orders. Thus, other embodiments of the operational flows that are described herein may omit blocks, add blocks, change the order of the blocks, combine blocks, or divide blocks into more blocks.

Figure 10:
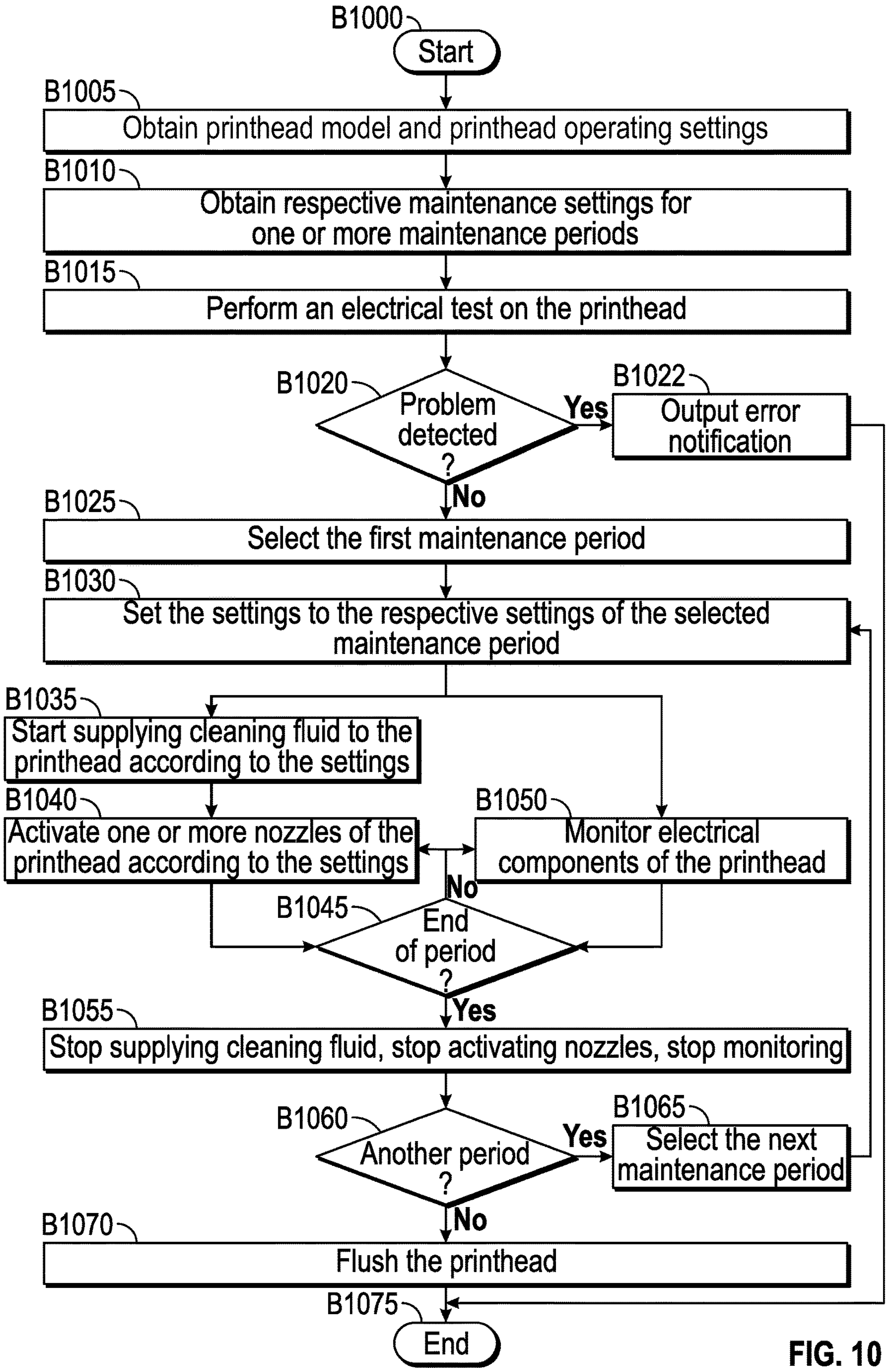
FIG. 10 illustrates an example embodiment of an operational flow for performing maintenance and diagnostics on a printhead.
Figure 11:
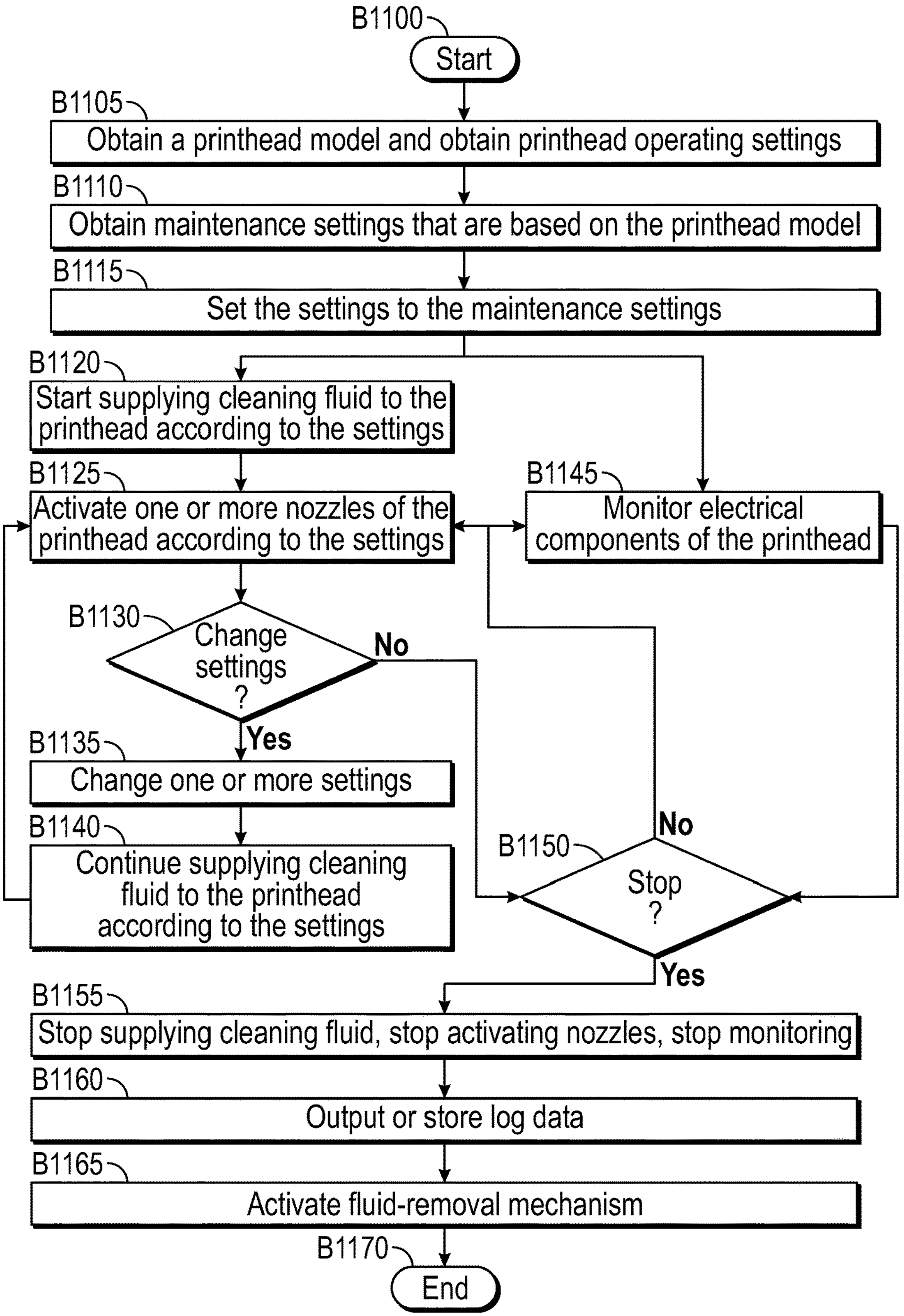
FIG. 11 illustrates an example embodiment of an operational flow for performing maintenance and diagnostics on a printhead.

Also, while performing the operational flows in FIGS. 9-11, the printhead-maintenance device may generate a log that includes data about one or more of the operations. For example, the log may include the settings of the printhead-maintenance device and any monitoring data (e.g., sensor readings) that are used in blocks B920, B930, B935, and B960.

The flow starts in block B900 and then moves to block B905, where a printhead-maintenance device detects a printhead that has been electrically connected to the printhead-maintenance device via one or more electrical connectors (e.g., the electrical connectors 131 in FIGS. 1-6). The printhead-maintenance device then obtains operating settings for the detected printhead, for example from internal storage or from another computing device. The operating settings include the respective settings, of one or more parameters, that are used during normal operation of the printhead. Examples of operating settings include the settings for the following parameters: voltage range (a range includes both high and low thresholds), maximum voltage, minimum voltage, current range, maximum current, minimum current, fluid-pressure range, fluid-pressure maximum, fluid-pressure minimum, fluid-temperature range, fluid-temperature maximum, fluid-temperature minimum, printhead-temperature range, printhead-temperature maximum, printhead-temperature minimum, maximum nozzle-activation rate, maximum nozzle-activation voltage, and a nozzle-activation waveform.

The flow then proceeds to block B910, where the printhead-maintenance device obtains settings (maintenance settings) for one or more parameters. Also for example, the maintenance settings may include settings for one or more of the following parameters: cleaning duration, duration in which cleaning-fluid is supplied, duration of pressurized fluid purge, cleaning-fluid pressure, cleaning-fluid temperature, air pressure, nozzle-activating rate, nozzle-activating voltage, nozzle-activating waveform, nozzle-activation duration, wiping pressure, and one or more test voltages. The printhead-maintenance device may obtain maintenance settings from user entry at a user interface, from internal storage, or from another computing device (e.g., via a network). For example, the printhead-maintenance device may display, and receive inputs from, various user interfaces on a display device 120, including the user interfaces that are shown in FIGS. 13-17. Also, some embodiments of the printhead-maintenance device automatically detect the model of the printhead and retrieve the maintenance settings for the detected model from internal storage or from an external device (e.g., an external storage device, an external computing device).

Next, in block B915, the printhead-maintenance device supplies air to the printhead via a conduit. The supplied air may flush ink and other materials out of the printhead. The flow then moves to block B920, where the printhead-maintenance device performs an electrical test on the printhead. In some embodiments, the printhead-maintenance device applies a voltage to an electrical line that is connected to the printhead and detects the current that flows through the electrical line. The applied voltage may be set according to the settings that were obtained in block B910. Also, some embodiments apply respective voltages to multiple electrical lines that are connected to the printhead and detect the respective currents that flow through the electrical lines. All the respective voltages may be identical, some may be identical and some different, or they all may be different. For example, some electrical lines may be higher-voltage lines and some may be lower-voltage lines.

Figure 23:
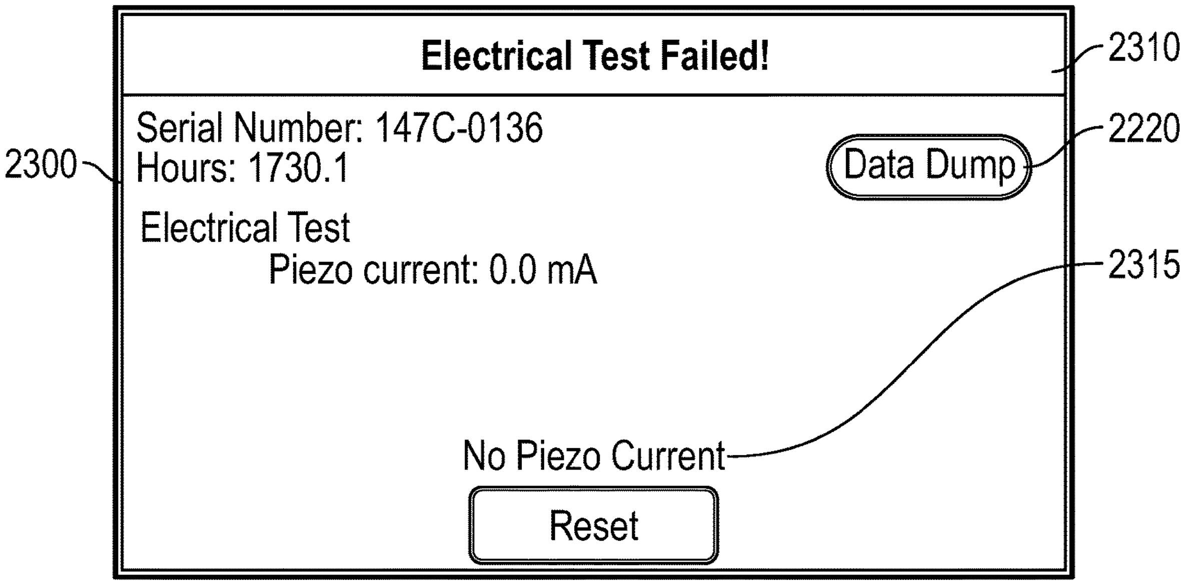

The flow then moves to block B925, where the printhead-maintenance device determines whether a problem was detected during the electrical test. For example, a problem may be detected if the current that was detected on an electrical line while a voltage was being applied exceeded a current threshold that was included in the operating settings that were obtained in block B905. If the printhead-maintenance device determines that a problem was detected (B925=Yes), then the flow advances to block B927, where the printhead-maintenance device outputs an error notification, and then the flow ends in block B970. For example, in block B927, the printhead-maintenance device may display the user interface that is shown in FIG. 23. If the printhead-maintenance device determines that a problem was not detected (B925=No), then the flow splits into a first flow and a second flow, which the printhead-maintenance device performs simultaneously or concurrently.

The first flow proceeds to block B930, where the printhead-maintenance device starts supplying cleaning fluid to the printhead according to the settings (e.g., temperature settings, pressure settings). For example, the printhead-maintenance device 10 in FIGS. 1-3 may starting supplying cleaning fluid to the printhead 200 via the supply conduit 181A. Also for example, the printhead maintenance device may heat the cleaning fluid or the printhead according to the settings. And, in block B930, the printhead-maintenance device may display a user interface that indicates the status of the maintenance operations, such as the user interface in FIG. 18 or the user interface in FIG. 19.

The first flow then moves to block B935, where the printhead-maintenance device activates one or more nozzles of the printhead by sending one or more electrical signals to the printhead via one or more electrical lines. Because the one or more nozzles are being activated while cleaning fluid is being supplied to the printhead, the nozzles, when activated, eject cleaning fluid. For example, the printhead-maintenance device may activate one or more piezo-electric actuators of the printhead, thereby causing cleaning fluid to be ejected from the respective nozzles of the piezo-electric actuators. The nozzles may also be activated according to a set pattern. For example, the nozzles may be activated in series; the nozzles in areas of the printhead may be activated together, progressing though each area in series; or all non-adjacent nozzles may be activated simultaneously (e.g., alternating between even- and odd-numbered nozzles). In block B935, the printhead-maintenance device may display a user interface that indicates the status of the maintenance operations, such as the user interface in FIG. 20.

The flow then moves to block B940, where the printhead-maintenance device determines whether to stop supplying cleaning fluid to the printhead. For example, the printhead-maintenance device may determine to stop supplying cleaning fluid if cleaning fluid has been supplied for more than a predetermined time, if a threshold amount of cleaning fluid has been supplied to the printhead, if a number of times that the one or more nozzles have been activated exceeds a threshold, or if an error is detected. Examples of errors include fluid leakage, an empty cleaning-fluid-supply tank, a supplied current that exceeds a threshold, a full cleaning-fluid-collection reservoir, insufficient air pressure, and insufficient fluid pressure. If the printhead-maintenance device determines not to stop supplying cleaning fluid to the printhead (B940=No), then the first flow returns to block B935. If the printhead-maintenance device determines to stop supplying cleaning fluid to the printhead (B940=Yes), then the first flow proceeds to block B945.

In block B945, the printhead-maintenance device stop supplying cleaning fluid to the printhead. The first flow then advances to block B955, where the first flow rejoins the second flow.

From block B925, the second flow proceeds to block B960. In block B960, the printhead-maintenance device monitors the electrical components of the printhead. For example, when the one or more nozzles of the printhead are activated in block B935, the printhead-maintenance device may detect the amperes that flow to the printhead in any electrical lines that are connected to the printhead.

Then, in block B965, the printhead-maintenance device determines whether to stop monitoring the electrical components of the printhead. For example, the printhead-maintenance device may determine to stop the monitoring if cleaning fluid has been supplied for more than a predetermined time, if a threshold amount of cleaning fluid has been supplied to the printhead, if a number of times that the one or more nozzles have been activated exceeds a threshold, if the supply of cleaning fluid has been stopped (e.g., in block B945), or if an error is detected. If the printhead-maintenance device determines not to stop monitoring the electrical components of the printhead (B965=No), then the second flow returns to block B960. If the printhead-maintenance device determines to stop monitoring the electrical components of the printhead (B965=Yes), then the second flow proceeds to block B955, where the second flow rejoins the first flow.

In block B955, the printhead-maintenance device supplies a storage solution (or ink) to the printhead, which flushes the cleaning fluid from the printhead. The flow then ends in block B970. Also, in block B970, the printhead-maintenance device may display a user interface that indicates that the maintenance operations were completed, such as the user interface in FIG. 22. And, in some embodiments, the printhead-maintenance device sends data about the maintenance process (e.g., log data) to another device. For example, some embodiments of the printhead-maintenance device send log data to another device that is connected via a data connector 1103.

FIG. 10 illustrates an example embodiment of an operational flow for performing maintenance and diagnostics on a printhead. The flow begins in block B1000 and moves to block B1005, where a printhead-maintenance device obtains data that indicate the model of the printhead and printhead operating settings. For example, the printhead-maintenance device may detect the model of a printhead that is connected to the printhead-maintenance device. Also for example, a user may enter the printhead model.

Next, in block B1010, the printhead-maintenance device obtains respective maintenance settings for one or more maintenance periods. The maintenance settings of a maintenance period indicate the parameter settings that the printhead-maintenance device will use during the maintenance period. Examples of parameters include the following: voltages of one or more electrical lines, currents of one or more electrical lines, a nozzle-activating rate, a nozzle-activating voltage, a nozzle-activating waveform, a fluid pressure, and a fluid temperature.

Also, at least some of the settings may be based on the model of the printhead, and at least some of the settings may be higher or lower than the corresponding operating settings. For example, in some embodiments, the output voltages of one or more voltage supply lines are higher or lower than the voltages of the voltage supply lines in the operating settings, the fluid pressure of the cleaning fluid is higher or lower than a fluid pressure of the printhead in the operating settings, the fluid temperature of the cleaning fluid is higher or lower than a fluid temperature of the printhead in the operating settings, a nozzle-activating rate of a nozzle of the printhead is higher or lower than a nozzle-activating rate of the nozzle in the operating settings, or a nozzle-activating voltage is a higher or lower than the nozzle-activating voltage in the operating settings.

Additionally, the maintenance settings may vary between maintenance periods. For example, in some embodiments, in a first maintenance period the following settings are higher than they are in any subsequent maintenance periods: the fluid pressure, the fluid temperature, the nozzle-activating rate, the nozzle-activating voltage. Also, these settings may be higher than the settings used during normal operation of the printhead. However, the duration of the first maintenance period may also be shorter than the duration of any subsequent maintenance periods. Thus, the first maintenance period may be a high-pressure, high-temperature, high-activating-rate, low-duration period.

By way of further example, the second maintenance period may have one or more settings that are lower than the settings of the corresponding parameters in the first maintenance period. And the second maintenance period may have a longer duration than the duration of the first maintenance period. Thus, the second maintenance period may be a lower-pressure, lower-temperature, lower-activating-rate, longer-duration period relative to the first maintenance period.

The flow then moves to block B1015, where the printhead-maintenance device performs an electrical test on the printhead based on the operating settings. Then, in block B1020, the printhead-maintenance device determines whether a problem was detected during the electrical test. If the printhead-maintenance device determines that a problem was detected during the electrical test (B1020=Yes), then the flow proceeds to block B1022, where the printhead-maintenance device outputs an error notification, and then the flow ends in block B1075. If the printhead-maintenance device determines that a problem was not detected during the electrical test (B1020=No), then the flow advances to block B1025.

In block B1025, the printhead-maintenance device selects the first maintenance period. Next, in block B1030, the printhead-maintenance device sets the settings of the printhead-maintenance device to the settings of the selected maintenance period. For example, the printhead-maintenance device may heat cleaning fluid to a set temperature, pressurize cleaning fluid in a supply conduit to a set pressure, or heat the printhead to a set temperature. And, in block B1030, the printhead-maintenance device may display a user interface that indicates the status of the maintenance operations, such as the user interface in FIG. 18 or the user interface in FIG. 19. The flow then splits into a first flow and a second flow.

The first flow moves to block B1035, where the printhead-maintenance device starts supplying cleaning fluid to the printhead according to the settings that were set in block B1030. For example, the printhead-maintenance device supplies the cleaning fluid at a temperature and a pressure that are defined by the settings.

Then, in block B1040, the printhead-maintenance device activates one or more nozzles of the printhead according to the settings that were set in block B1030. For example, the printhead-maintenance device activates the nozzles according to an activating waveform that is defined by the settings. The first flow then moves to block B1045, where the first flow rejoins the second flow.

From block B1030, the second flow moves to block B1050, where the printhead-maintenance device monitors the electrical components of the printhead. The second flow then moves to block B1045, where the second flow rejoins the first flow.

In block B1045, the printhead-maintenance device determines if the end of the maintenance period has been reached. For example, the maintenance period may be defined by a temporal duration, a number of activatings of the one or more nozzles, or a volume of cleaning fluid that is supplied. If the printhead-maintenance device determines that the end of the period has not been reached (B1045=No), then the first flow returns to block B1040, and the second flow returns to block B1050. If the printhead-maintenance device determines that the end of the period has been reached (B1045=Yes), then the flow proceeds to block B1055.

In block B1055, the printhead-maintenance device stops supplying cleaning fluid, stops activating the nozzles, and stops monitoring the electrical components.

In block B1060, the printhead-maintenance device determines whether the one or more maintenance periods include a maintenance period that has not been performed. If the printhead-maintenance device determines that the one or more maintenance periods include a maintenance period that has not been performed (B1060=Yes), then the flow moves to block B1065, where the printhead-maintenance device selects the next maintenance period, and then the flow returns to block B1030. If the printhead-maintenance device determines that the one or more maintenance periods do not include a maintenance period that has not been performed (B1060=No), then the flow proceeds to block B1070.

In block B1070, the printhead-maintenance device flushes the cleaning solution from the printhead with a storage solution or with ink. Also, in block B1070, the printhead-maintenance device may display a user interface that indicates that the flushing is being performed, such as the user interface in FIG. 21. Finally, the flow ends in block B1075.

FIG. 11 illustrates an example embodiment of an operational flow for performing maintenance and diagnostics on a printhead. The flow starts in block B1100 and moves to block B1105, where a printhead-maintenance device obtains data that indicate a printhead model and that include printhead operating settings. Next, in block B1110, the printhead-maintenance device obtains maintenance settings that are based on the printhead model. The maintenance settings may include multiple respective settings for each parameter, and the maintenance settings may indicate an order of the settings for each parameter that has multiple settings. For example the maintenance settings may include a series of settings for fluid pressure, a series of settings for fluid temperature, a series of settings for nozzle-activating rate, or a series of settings for nozzle-activating waveforms. Then, in block B1115, the printhead-maintenance device sets its settings to the maintenance settings. If the maintenance settings include multiple respective settings of a parameter, then the parameter's setting is set to the first setting of the respective settings. The flow then splits into a first flow and a second flow.

The first flow proceeds to block B1120, where the printhead-maintenance device starts supplying cleaning fluid to the printhead according to the settings (e.g., the fluid-pressure setting, the fluid-temperature setting). Then, in block B1125, the printhead-maintenance device activates one or more nozzles of the printhead according to the settings (e.g., the nozzle-activating-rate setting, the nozzle-activating-voltage setting, the nozzle-activating-waveform setting).

The first flow then moves to block B1130, where the printhead-maintenance device determines whether to change any settings. For example, the printhead-maintenance device may determine to change a setting if the maintenance settings indicate that the setting should be changed after a period of time has elapsed, after a certain amount of fluid has been supplied to the printhead, or after a certain number of nozzle activations. Also, the printhead-maintenance device may determine to change a setting based on the data obtained by the monitoring of the electrical components in block B1145. If the printhead-maintenance device determines not to change one or more settings (B1130=No), then the first flow proceeds to block B1150. If the printhead-maintenance device determines to change one or more settings (B1130=Yes), then the first flow moves to block B1135. In block B1135, the printhead-maintenance device changes one or more settings. Then, in block B1140, the printhead-maintenance device continues supplying cleaning fluid to the printhead according to the settings. The first flow then returns to block B1125.

From block B1115, the second flow moves to block B1145, where the printhead-maintenance device monitors the electrical components of the printhead, and the printhead-maintenance device generates monitoring data based on the monitoring of the electrical components. Examples of monitoring data include the following: the respective amperes flowing through one or more electrical lines (e.g., piezo-actuator current, printhead-heater current), the respective voltages one of or more electrical lines, cleaning-fluid temperature, cleaning-fluid pressure, printhead temperature, nozzle-activation voltage, nozzle-activation waveform, and total time of nozzle-activation. The printhead-maintenance device may store the monitoring data in a log. The second flow then advances to block B1150.

In block B1150, the printhead-maintenance device determines whether to stop supplying the cleaning fluid, stop activating the nozzles, and stop monitoring the electrical components. The printhead-maintenance device may determine to stop if the monitoring of the electrical components indicates an electrical problem. For example, if the monitoring data indicate that an electrical component is operating outside of the printhead operating settings (e.g., a current is too high, a current is too low, a temperature is too high, a temperature is too low), then some embodiments of the printhead-maintenance device determine to stop. If the printhead-maintenance device determines not to stop (B1150=No), then the first flow returns to block B1125, and the second flow returns to block B1145. If the printhead-maintenance device determines to stop (B1150=Yes), then the first flow rejoins the second flow, and the flow proceeds to block B1155. In block B1155, the printhead-maintenance device stops supplying the cleaning fluid, stops activating the nozzles, and stops monitoring the electrical components.

The flow then proceeds to block B1160, where the printhead-maintenance device outputs (e.g., sends to another device) or stores the log data, which may include monitoring data. In some embodiments, the printhead-maintenance device outputs or stores the log data in response to receiving an instruction (e.g., from activating the control 2220 in FIG. 22). Thus, the log data may be added to a database, and other computing devices can use the log data for analysis and optimization.

Next, in block B1165, the printhead-maintenance device activates a fluid-removal mechanism. For example, some embodiments of the printhead-maintenance device activate a wiping mechanism, a vacuum, or a blower. In some embodiments in which the fluid-removal mechanism is a wiping mechanism, the printhead-maintenance device receives a wiper-pressure reading from a pressure sensor and, based on the wiper-pressure reading, adjusts the pressure that the wiping mechanism applies to the printhead. For example, the printhead-maintenance device may adjust the wiping pressure to a set pressure, which may be based on the model of the printhead. Also, the wiping mechanism may wipe the printhead in a particular pattern, such as a respective pattern that is based on the model of the printhead (different models of printheads may have different wiping patterns).

The flow then ends in block B1170.

Figure 12:
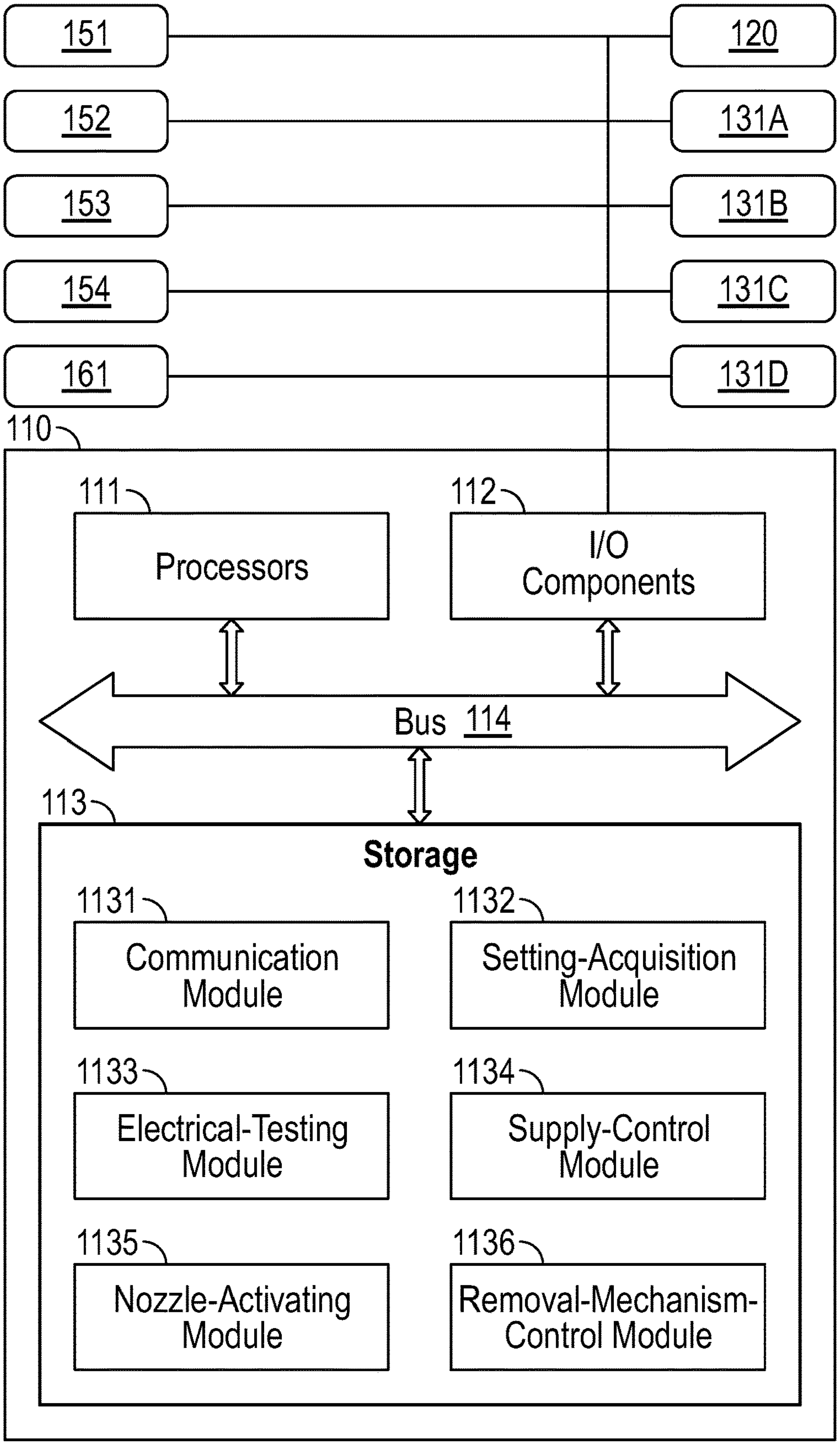
FIG. 12 illustrates an example embodiment of a control device.

FIG. 12 illustrates an example embodiment of a control device 110 of a printhead-maintenance device. The control device 110 includes one or more processors 111, one or more I/O components 112, and storage 113. Also, the hardware components of the control device 110 communicate via one or more buses 114 or other electrical connections. Examples of buses 114 include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 111 include one or more central processing units (CPUs), which include microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). The I/O components 112 include communication components (e.g., a GPU, a network-interface controller) that communicate with other members of the printhead-maintenance device (e.g., a display device 120, electrical connectors 131, a cleaning-fluid-pressure sensor 151, a cleaning-fluid-temperature sensor 152, a supply-level sensor 153, a collection-level sensor 154, a pressure control 161), with a printhead (via the electrical connectors 131), and with other input or output devices (not illustrated), which may include a network device, a keyboard, a mouse, a printing device, a display device, a light pen, an optical-storage device, a scanner, a microphone, a drive, and a controller (e.g., a joystick, a control pad).

The storage 113 includes one or more computer-readable storage media. As used herein, a computer-readable storage medium is a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 113, which may include both ROM and RAM, can store computer-readable data or computer-executable instructions.

The control device 110 additionally includes a communication module 1131, a setting-acquisition module 1132, an electrical-testing module 1133, a supply-control module 1134, a nozzle-activating module 1135, and a removal-mechanism-control module 1136. A module includes logic, computer-readable data, or computer-executable instructions. In the embodiment shown in FIG. 12, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 113. Also, in some embodiments, the control device 110 includes additional or fewer modules, the modules are combined into fewer modules, or the modules are divided into more modules.

The communication module 1131 includes instructions that cause the control device 110 to control the printhead-maintenance device to communicate with one or more other devices, such as other computing devices that communicate with the control device 110 via a network, and to generate user interfaces (e.g., the user interfaces in FIGS. 13-23) for display on a display device. For example, some embodiments of the communication module 1131 include instructions that cause the control device 110 to control the printhead-maintenance device to perform at least some of the operations that are described in block B1060.

The setting-acquisition module 1132 includes instructions that cause the control device 110 to control the printhead-maintenance device to detect a printhead or to obtain and set the settings for one or more maintenance parameters (e.g., the maintenance settings for one or more maintenance periods). For example, some embodiments of the setting-acquisition module 1132 include instructions that cause the control device 110 to control the printhead-maintenance device to perform at least some of the operations that are described in blocks B905-B910 in FIG. 9, blocks B1005-B1010 in FIG. 10, or in blocks B1105-B1110 in FIG. 11.

The electrical-testing module 1133 includes instructions that cause the control device 110 to control the printhead-maintenance device to perform one or more electrical tests on a printhead and to monitor the electrical components of a printhead. For example, some embodiments of the electrical-testing module 1133 include instructions that cause the control device 110 to control the printhead-maintenance device to perform at least some of the operations that are described in blocks B920-B927 and B960-B965 in FIG. 9, in blocks B1015-B1022 and B1050 in FIG. 10, or in block B1145 in FIG. 11.

The supply-control module 1134 includes instructions that cause the control device 110 to control the printhead-maintenance device 10 to supply air or cleaning fluid to a printhead according to the settings. For example, some embodiments of the supply-control module 1134 include instructions that cause the control device 110 to control the printhead-maintenance device to perform at least some of the operations that are described in blocks B915, B930, B940, B945, and B955 in FIG. 9; in blocks B1025-B1035 and B1055-B1065 in FIG. 10; or in blocks B1115, B1120, B1130-B1140, and B1155 in FIG. 11.

The nozzle-activating module 1135 includes instructions that cause the control device 110 to control the printhead-maintenance device 10 to activate one or more nozzles of a printhead (e.g., by activating a piezo-electric actuator of a nozzle, by activating a heading element of a nozzle). For example, some embodiments of the nozzle-activating module 1135 include instructions that cause the control device 110 to control the printhead-maintenance device to perform at least some of the operations that are described in block B935 in FIG. 9, in blocks B1040 and B1055 in FIG. 10, or in blocks B1125 and B1155 in FIG. 11.

The removal-mechanism-control module 1136 includes instructions that cause the control device 110 to control the printhead-maintenance device to remove remaining cleaning fluid from the interior (by flushing) or the exterior of a printhead. For example, some embodiments of the removal-mechanism-control module 1136 include instructions that cause the control device 110 to control the printhead-maintenance device to perform at least some of the operations that are described in block B955 in FIG. 9, in block B1070 in FIG. 10, or in blocks B1165-B1170 in FIG. 11.

FIGS. 13-23 illustrate example embodiments of user interfaces. The user interfaces may be displayed by a display device of a printhead-maintenance device or by another computing device that is in communication with the printhead-maintenance device. Also, some of these user interfaces receive respective settings for various parameters.

Figure 13:
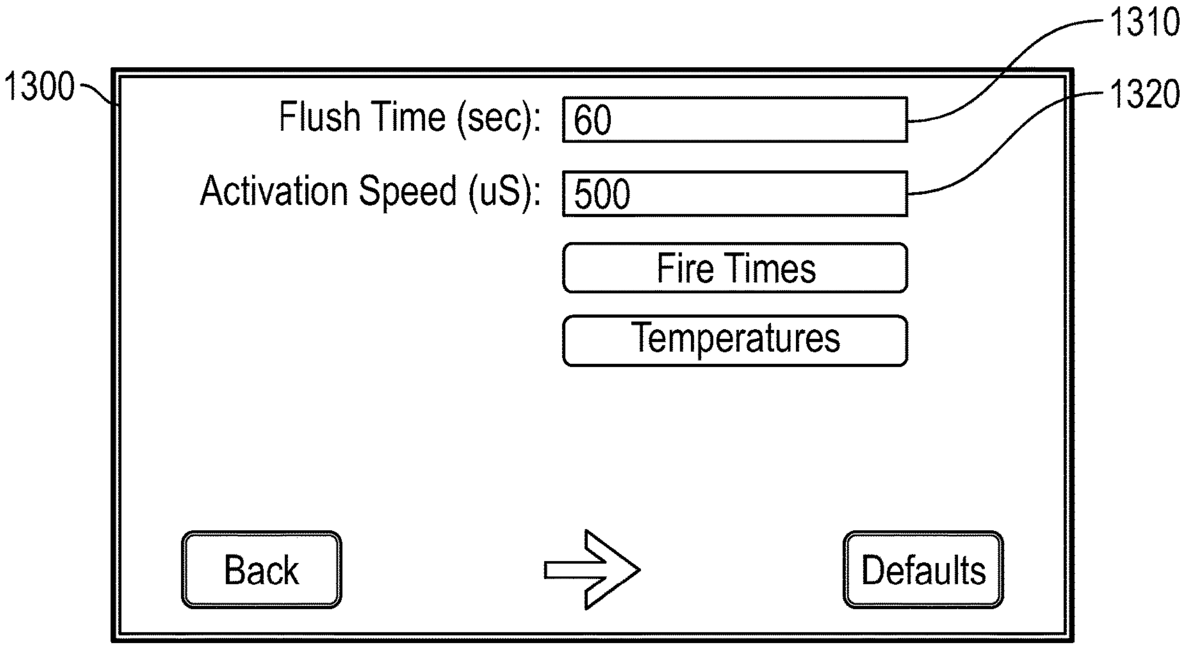
FIGS. 13-23 illustrate example embodiments of user interfaces.

The user interface 1300 in FIG. 13 has a first field 1310 that receives the setting for a flush-time parameter and has a second field 1320 that receives a setting for an activation-speed parameter, which indicates the time interval between nozzle activations.

Figure 14:
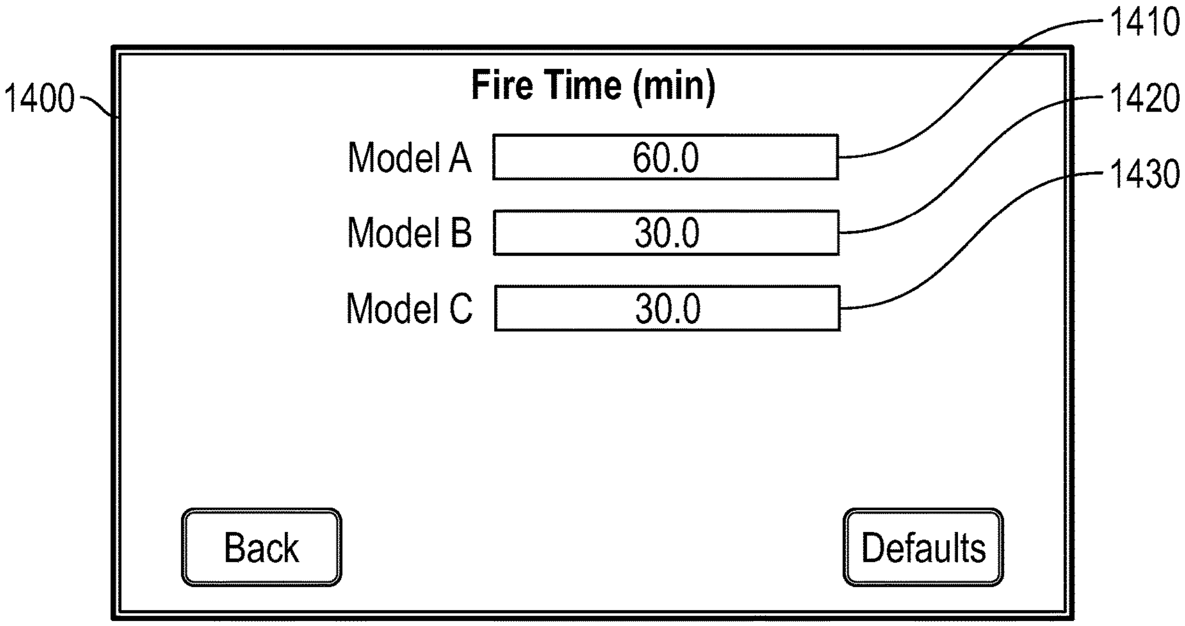

The user interface 1400 in FIG. 14 allows a user to enter respective fire-time settings (nozzle-activation-time settings) for models of printheads. The user interface 1400 has a first field 1410 that receives the fire-time setting for a first model of printhead, a second field 1420 that receives the fire-time setting for a second model of printhead, and a third field 1430 that receives the fire-time setting for a third model of printhead.

Figure 15:
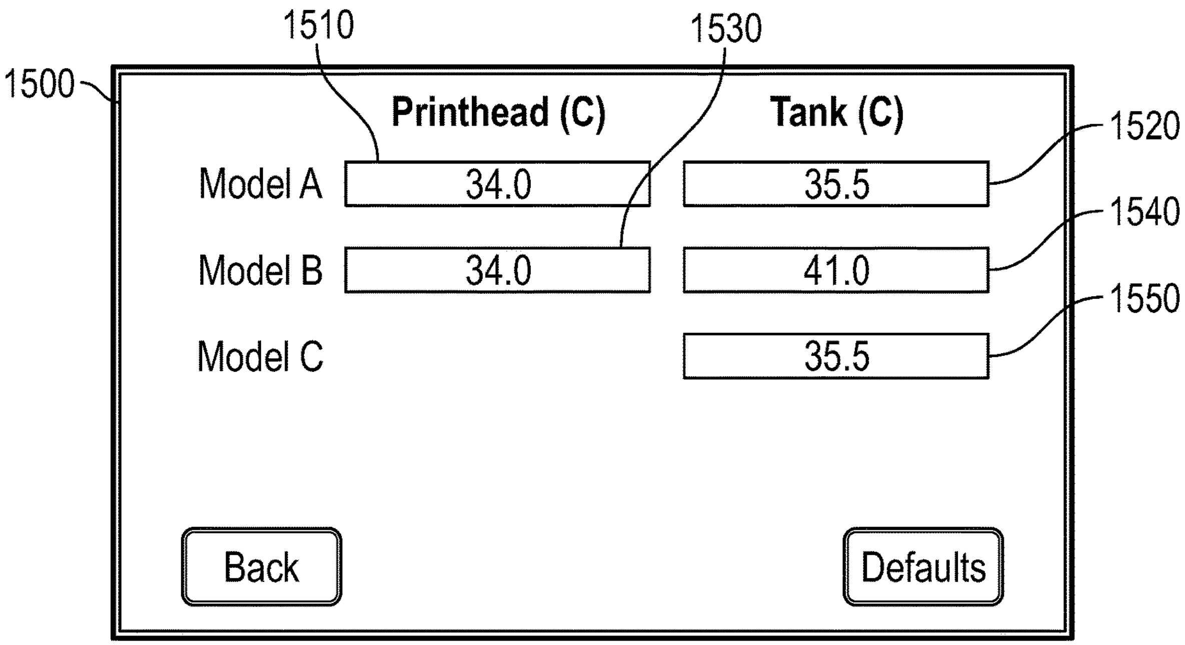

The user interface 1500 in FIG. 15 allows a user to enter respective printhead temperatures and tank (cleaning-fluid-supply tank) temperatures for models of printheads. The user interface 1500 has a first field 1510 that receives the printhead-temperature setting for a first model of printhead, a second field 1520 that receives the tank-temperature setting for the first model of printhead, a third field 1530 that receives the printhead-temperature setting for a second model of printhead, a fourth field 1540 that receives the tank-temperature setting for the second model of printhead, and a fifth field 1550 that receives the tank-temperature setting for a third model of printhead. In this example, the user interface 1500 does not allow a user to input a printhead-temperature setting for the third model of printhead because the third model of printhead does not include a heater.

Figure 16:
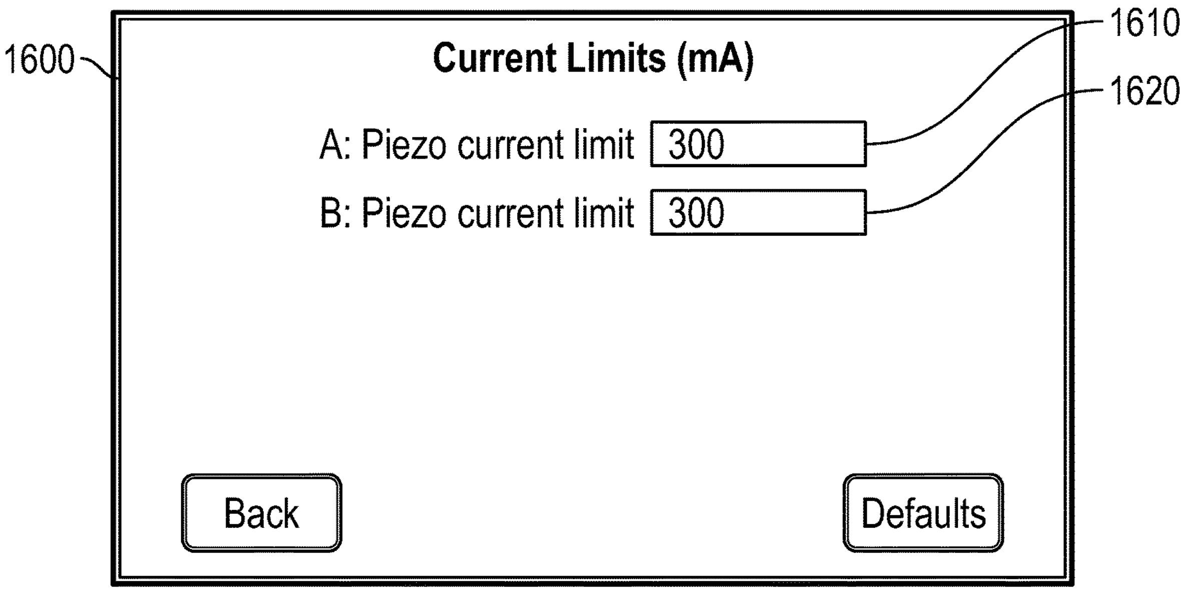

The user interface 1600 in FIG. 16 allows a user to enter actuator-current limits (limits on the currents that are supplied to piezo actuators) for a printhead. The user interface 1600 includes a first field 1610 that receives an actuator-current-limit setting for a first model of printhead and includes a second field 1620 that that receives an actuator-current-limit setting for a second model of printhead.

Figure 17:
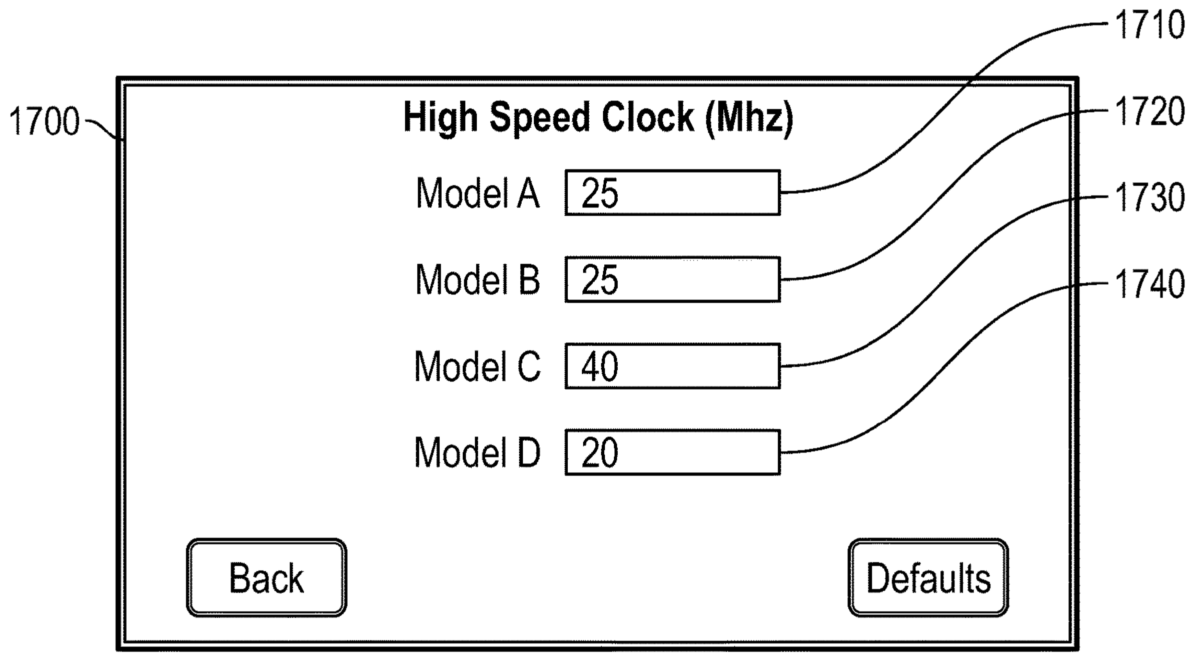

The user interface 1700 in FIG. 17 allows a user to enter clock rates for models of printheads. The user interface 1700 includes a first field 1710 that receives a clock-rate setting for a clock signal that is supplied to a first model of printhead, a second field 1720 that receives a clock-rate setting for a clock signal is supplied to a second model of printhead, a third field 1730 that receives a clock-rate setting for a clock signal is supplied to a third model of printhead, and a fourth field 1740 that receives a clock-rate setting for a clock signal that is supplied to a fourth model of printhead.

Figure 18:
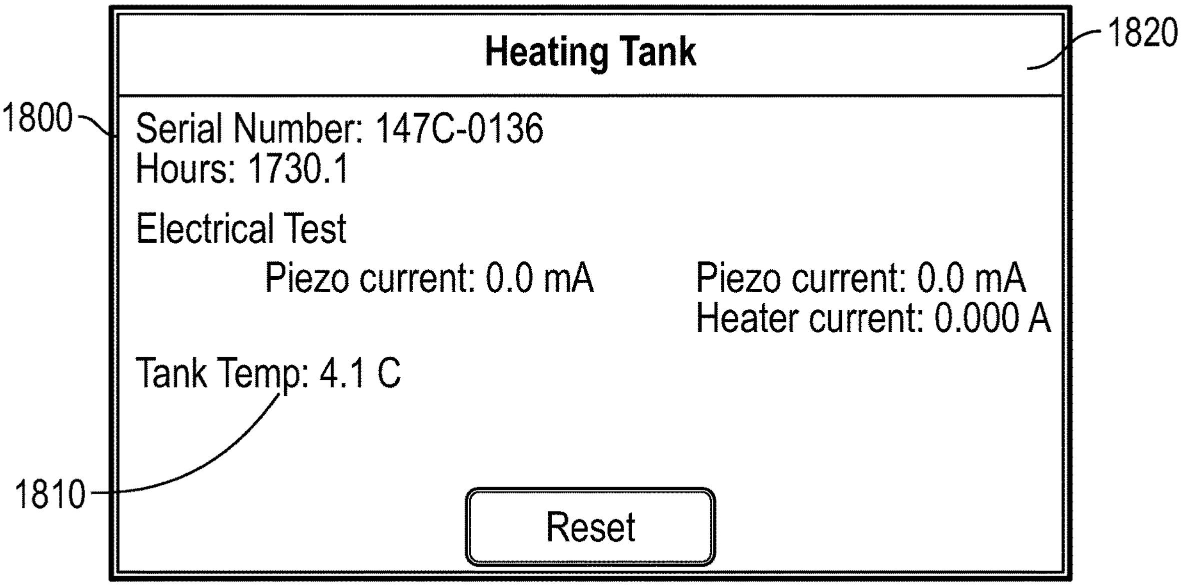

The user interface 1800 in FIG. 18 displays the temperature 1810 of the cleaning fluid in a cleaning-supply-fluid tank. The user interface 1800 also displays a banner 1820 that indicates that the cleaning fluid is being heated by a printhead-maintenance device.

Figure 19:
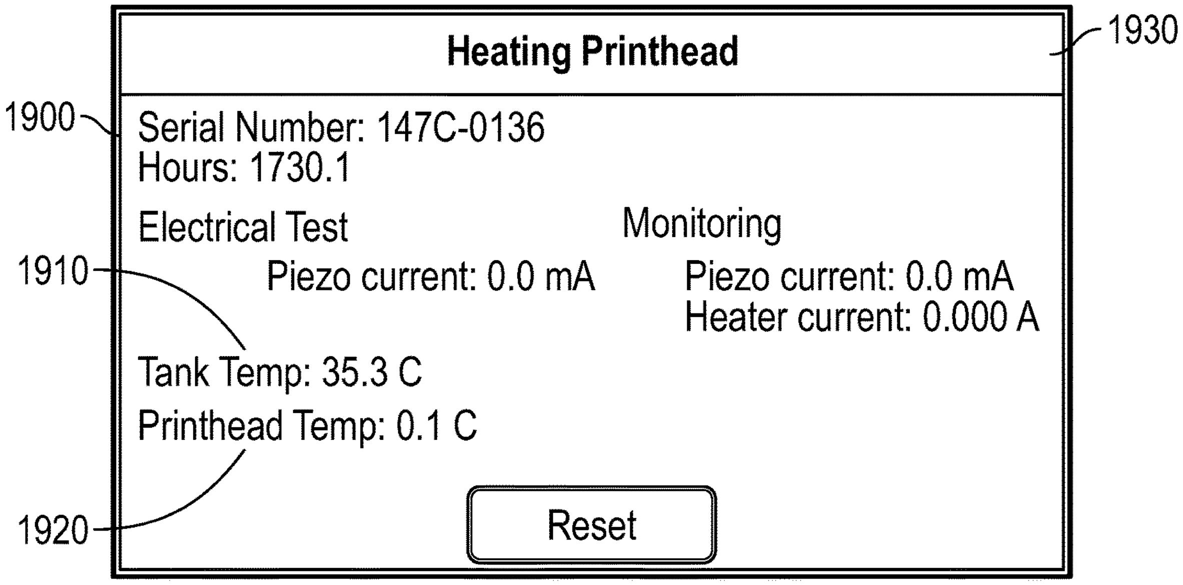

The user interface 1900 in FIG. 19 displays the temperature 1910 of the cleaning fluid in a cleaning-supply-fluid tank and the temperature 1920 of a printhead. The user interface 1900 also displays a banner 1930 that indicates that the printhead-maintenance device is heating the printhead (e.g., by sending signals to the printhead that activate one or more heaters in the printhead).

Figure 20:
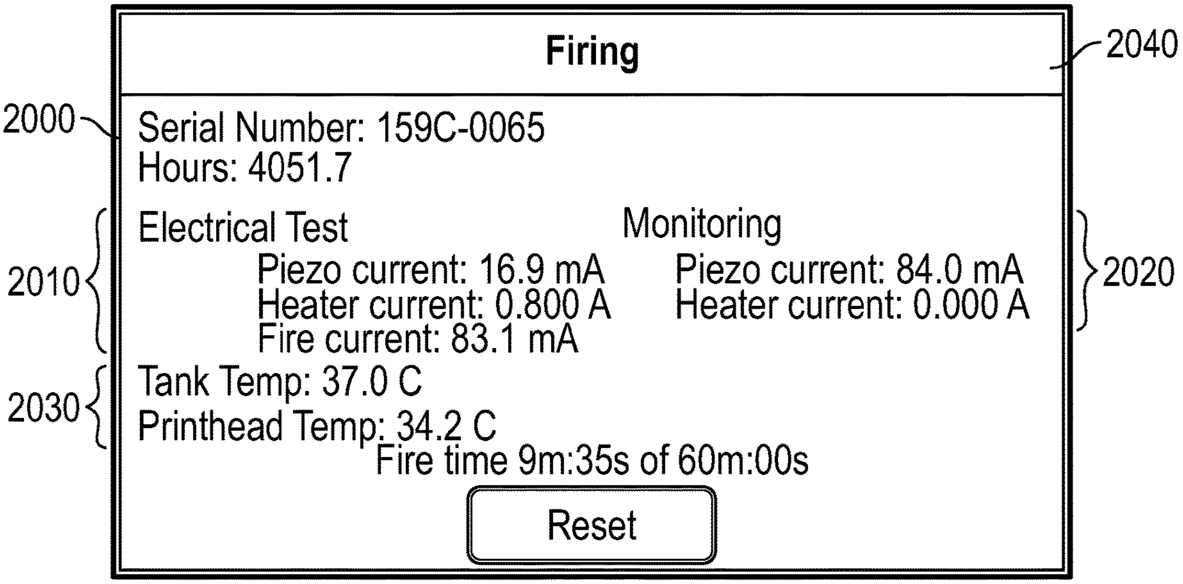

The user interface 2000 in FIG. 20 displays the readings 2010 of various sensors of the printhead-maintenance device that were obtained during an electrical test (e.g., in block B920, in block B1015). The sensors include a piezo-current sensor, a heater-current sensor, a cleaning-fluid temperature, and a printhead temperature.

"Piezo current" under "Electrical Test" indicates the resulting current draw through a piezo voltage-supply line while the printhead is not firing (e.g., the data being sent to the printhead from the control device include data that instruct the printhead not to activate any piezoelectric nozzles). During this test, voltage is supplied through the piezo voltage-supply line, but no nozzles are activated.

"Heater current" under "Electrical Test" indicates the resulting current draw through a heater voltage-supply line while voltage is being supplied through the heater voltage-supply line (e.g., while one or more heaters are activated).

"Fire current" under "Electrical Test" indicates the resulting current draw through the piezo voltage-supply line while the printhead is firing (e.g., the data being sent to the printhead from the control device include data that instruct the printhead to activate one or more piezoelectric nozzles). During this test, voltage is supplied to the piezo voltage-supply line, and one or more nozzles are activated.

The user interface 2000 also displays the present readings of various sensors 2020. The present readings of the various sensors 2020 are continually updated (e.g., updated in real time) while the maintenance process is being performed. The value "Piezo current" under "Monitoring" refers to the real-time current draw through the piezo voltage-supply line at any given moment in time during the cleaning process, whether the printhead is firing at that particular time. Also for example, when the printhead is not firing (not activating nozzles), the value "Piezo current" under "Monitoring" may be expected to be approximately equal to the value "Piezo current" under "Electrical test". Similarly, when the printhead is firing (activating nozzles), the value "Piezo current" under "Monitoring" may be expected to be approximately equal to the value "Fire current" under "Electrical Test".

The value "Heater current" under "Monitoring" refers to the real-time current draw through the heater voltage-supply line at any given moment in time during the cleaning process. When, at a particular moment in time during the cleaning process, the heaters in the printhead are activated (e.g., by sending, to the printhead, data that instruct the printhead to activate its heaters), the value "Heater current" under "Monitoring" may be expected to be approximately equal to the value "Heater current" under "Electrical Test".

Additionally, the user interface 2000 displays the present readings 2030 of the cleaning-fluid-temperature sensor and the printhead-temperature sensor. And the user interface 2000 displays a banner 2040 that indicates that the printhead-maintenance device is activating the printhead's nozzles.

Figure 21:
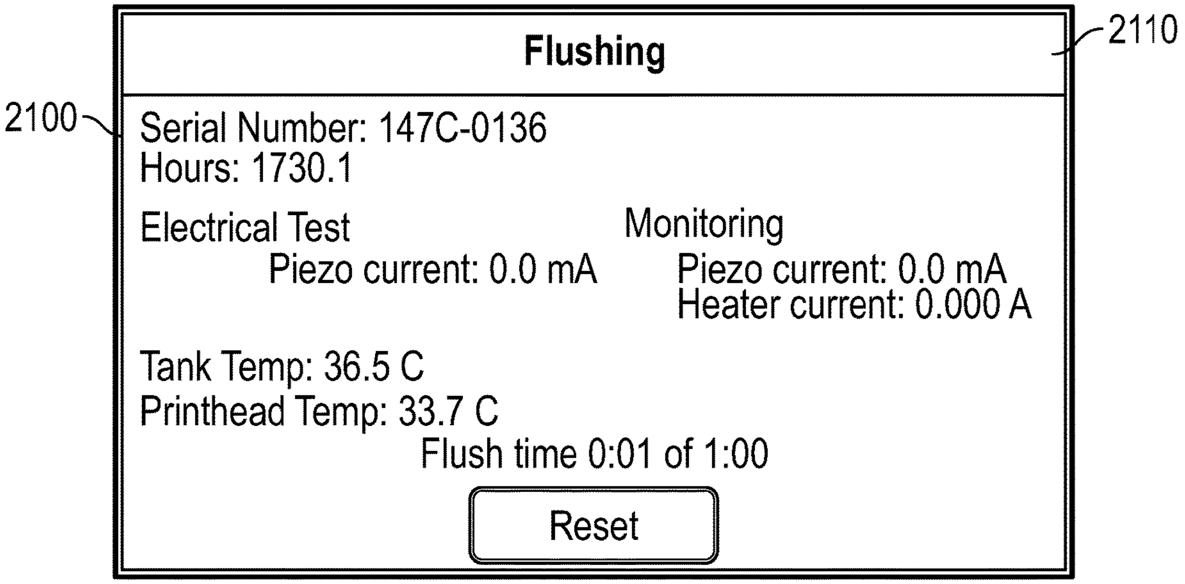

The user interface 2100 in FIG. 21 displays a banner 2110 that indicates that the printhead-maintenance device is flushing the printhead.

Figure 22:
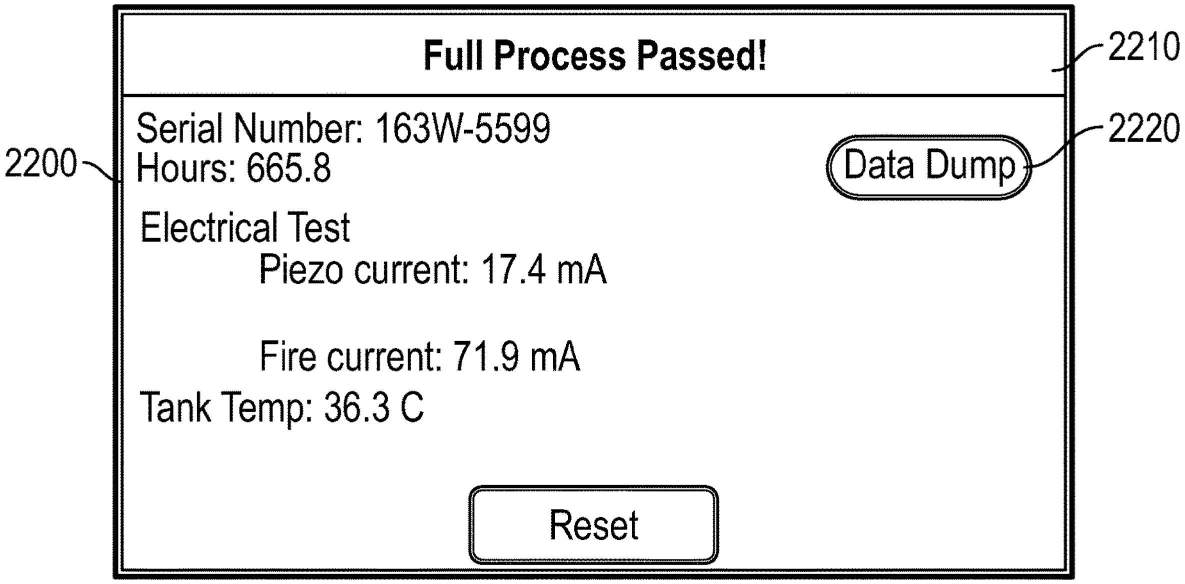

The user interface 2200 in FIG. 22 displays a banner 2210 that indicates that the printhead-maintenance device has finished the maintenance operations. The user interface 2200 also displays a control 2220 that, when activated, causes the printhead-maintenance device to send the log data that the printhead-maintenance device collected during the maintenance operations to another device (e.g., a computing device that is connected to the printhead-maintenance device via a network).

The user interface 2300 in FIG. 23 displays a banner 2310 that indicates that a printhead failed an electrical test. The user interface 2300 also displays a notification 2315 that explains the cause of the failure and displays the control 2220 that, when activated, causes the printhead-maintenance device to send the log data that the printhead-maintenance device collected during the maintenance operations to another device.

What is claimed is:

1. A device comprising:
a cleaning-fluid-supply reservoir;
a cleaning-fluid-supply conduit;
one or more electrical connectors that are configured to be attached to a printhead and supply electrical signals to the printhead;
one or more memories; and
one or more processors that are in communication with the one or more memories and that cooperate with the one or more memories to cause the device to perform operations including:
supplying cleaning fluid from the cleaning-fluid-supply reservoir, through the cleaning-fluid-supply conduit, to the printhead, and
while supplying the cleaning fluid to the printhead, sending a signal to the printhead, through the one or more electrical connectors, to activate one or more piezo-electric actuators of the printhead to eject the cleaning fluid through one or more nozzles of the printhead.

2. The device of claim 1, further comprising:
a wiping mechanism;
a motor; and
a pressure sensor,
wherein the operations further include:
activating the motor to wipe the printhead with the wiping mechanism,
receiving a wiping-pressure reading from the pressure sensor, and
adjusting a wiping pressure of the wiping mechanism based on the wiping-pressure reading.

3. The device of claim 1, further comprising:
a heater; and
a temperature sensor,
wherein the operations further include:
heating the cleaning fluid that is supplied to the printhead.

4. The device of claim 1, wherein the operations further include:
obtaining data that indicate one or more operating settings of the printhead.

5. The device of claim 4, further comprising:

a cleaning-fluid-pressure sensor, wherein the one or more operating settings of the printhead include an operating pressure of the printhead, and wherein the operations further include pressurizing the cleaning fluid that is supplied to the printhead to a pressure that is higher than the operating pressure of the printhead.

6. The device of claim 4, further comprising:

an ammeter, wherein the one or more operating settings of the printhead include a current threshold of the printhead, and wherein the operations further include:

supplying a voltage, through the one or more electrical connectors, to the printhead;

measuring an electrical current that flows to the printhead while the voltage is supplied to the printhead;

determining if the electrical current exceeds the current threshold of the printhead; and in a case where the electrical current exceeds the current threshold, stopping the supplying of the voltage and stopping the supply of cleaning fluid.

7. The device of claim 4, wherein that data that indicate the one or more operating settings of the printhead are obtained, via the one or more electrical connectors, from the printhead.

8. The device of claim 4, further comprising:

one or more input devices that are configured to receive inputs from a user, wherein the data that indicate the one or more operating settings of the printhead are obtained from the one or more input devices.

9. The device of claim 1, further comprising:

a display device; and one or more input devices that are configured to receive inputs from a user, wherein the operations further include:

receiving data from the one or more input devices that indicate one or more of the following: a cleaning-fluid pressure, a cleaning duration, a cleaning-fluid temperature, and a piezo-electric-actuator activation sequence.

10. The device of claim 1, further comprising one or more of the following:

a printhead mount;

a cleaning-fluid filter;

a cleaning-fluid-collection reservoir;

a vacuum;

a fan;

a compressor;

an external data interface; and multiple electrical connectors.

11. A method comprising:

supplying cleaning fluid from a cleaning-fluid-supply reservoir, through a cleaning-fluid-supply conduit, to a printhead, wherein the printhead includes a plurality of nozzles; and while supplying the cleaning fluid to the printhead, sending signals to the printhead, through one or more electrical connectors, to activate one or more nozzles of the plurality of nozzles to eject the cleaning fluid.

12. The method of claim 11, wherein activating the one or more nozzles includes activating a respective piezo-electric actuator of each of the one or more nozzles.

13. The method of claim 11, wherein activating the one or more nozzles includes activating a respective heater of each of the one or more nozzles.

14. The method of claim 11, further comprising:

detecting a model of the printhead; and setting a pressure of the cleaning fluid that is supplied to the printhead based on the model of the printhead.

15. The method of claim 11, further comprising:

detecting a model of the printhead; and heating the cleaning fluid that is supplied to the printhead to a temperature that is based on the model of the printhead.

16. A device comprising:

a cleaning-fluid-supply reservoir;

a cleaning-fluid-supply hose;

one or more memories; and one or more processors that are in communication with the one or more memories and that cooperate with the one or more memories to cause the device to perform operations including:

obtaining data that indicate one or more operating settings of the printhead, wherein the one or more operating settings include one or more of the following: a cleaning-fluid-pressure threshold and a cleaning-fluid-temperature threshold, setting a cleaning-fluid pressure and a cleaning-fluid temperature, wherein the cleaning-fluid pressure is set to a pressure that exceeds the cleaning-fluid-pressure threshold or the cleaning-fluid temperature is set to a temperature that exceeds the cleaning-fluid-temperature threshold, and supplying cleaning fluid from the cleaning-fluid-supply reservoir, through the cleaning-fluid-supply hose, to the printhead according to the cleaning-fluid pressure and the cleaning-fluid temperature.

17. The device of claim 16, further comprising:

an electrical connector that is configured to be attached to the printhead, wherein the one or more operating settings of the printhead further include an input voltage of the printhead, and wherein the operations further include supplying a voltage that is higher than the input voltage of the printhead to the printhead through the electrical connector.

18. The device of claim 16, further comprising:

an electrical connector that is configured to be attached to the printhead, wherein the one or more operating settings of the printhead further include a nozzle-activating rate of the printhead, and wherein the operations further include sending signals to the printhead, through the electrical connector, to activate at least one nozzle of the printhead at an activating rate that is greater than or less than the nozzle-activating rate of the printhead.

19. The device of claim 16, wherein the cleaning-fluid pressure is set to a pressure that exceeds the cleaning-fluid-pressure threshold and the cleaning-fluid temperature is set to a temperature that exceeds the cleaning-fluid-temperature threshold.

20. The device of claim 16, further comprising:

a plurality of sensors, wherein the operations further include while supplying the cleaning to the printhead, obtaining sensors readings from the plurality of sensors, and storing the sensor readings in the one or more memories.

* * * * *